US008340836B2

(12) United States Patent
Taylor

(10) Patent No.: US 8,340,836 B2
(45) Date of Patent: Dec. 25, 2012

(54) INTELLIGENT SELECTIVELY-TARGETED COMMUNICATIONS METHODS

(75) Inventor: Lance G. Taylor, Victorville, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/952,148

(22) Filed: Nov. 22, 2010

(65) Prior Publication Data

US 2011/0066304 A1 Mar. 17, 2011

Related U.S. Application Data

(60) Continuation of application No. 10/961,659, filed on Oct. 8, 2004, now Pat. No. 7,865,309, which is a division of application No. 10/383,214, filed on Mar. 5, 2003, now Pat. No. 7,113,107.

(60) Provisional application No. 60/362,609, filed on Mar. 7, 2002.

(51) Int. Cl.
*G05D 1/00* (2006.01)

(52) U.S. Cl. ........................................... 701/2; 340/902

(58) Field of Classification Search ................ 701/2, 96; 340/902, 903

See application file for complete search history.

(56) References Cited

U.S. PATENT DOCUMENTS

| | | | |
|---|---|---|---|
| 3,660,811 | A | 5/1972 | Vail et al. |
| 3,673,560 | A | 6/1972 | Barsh et al. |
| 3,784,970 | A | 1/1974 | Simpkin |
| 3,997,868 | A | 12/1976 | Ribnick et al. |
| 4,013,994 | A | 3/1977 | Ragano et al. |
| 4,238,778 | A | 12/1980 | Oshumi |
| 4,403,208 | A | 9/1983 | Hodgson et al. |
| 4,706,086 | A | 11/1987 | Panizza |
| 4,747,064 | A | 5/1988 | Johnston |
| 4,764,978 | A | 8/1988 | Argo et al. |
| 4,785,474 | A | 11/1988 | Bernstein et al. |
| 4,794,394 | A | 12/1988 | Halstead |
| 4,835,537 | A | 5/1989 | Manion |
| 5,235,329 | A | 8/1993 | Jackson |
| 5,289,181 | A | 2/1994 | Watanabe et al. |
| 5,428,544 | A | 6/1995 | Shyu |
| 5,429,329 | A | 7/1995 | Wallace et al. |

(Continued)

FOREIGN PATENT DOCUMENTS

| | | |
|---|---|---|
| CA | 2 478 255 | 1/2010 |

(Continued)

OTHER PUBLICATIONS

National weather Service Now Broadcasting Severe Weather Warnings for More Specific Geographic Areas, Aug. 19, 1997, http://www.nws.noaa.gove/pa/secmews/releases/same.htm, p. 1-2.

(Continued)

*Primary Examiner* — Helal A Algahaim
(74) *Attorney, Agent, or Firm* — NSIP Law

(57) ABSTRACT

A method for receiving at least one of advisory information and vehicle control information in a vehicle-mounted system, comprising: receiving at least one of advisory information and vehicle control information from a transmitting unit using a receiving unit; determining whether the at least one of the advisory information and the vehicle control information is directed to the receiving unit; and if the at least one of the advisory information and the vehicle control information is directed to the receiving unit, outputting the at least one of the advisory information and the vehicle control information.

10 Claims, 18 Drawing Sheets

U.S. PATENT DOCUMENTS

| | | | | |
|---|---|---|---|---|
| 5,495,243 | A | 2/1996 | McKenna | |
| 5,546,311 | A | 8/1996 | Sekine | |
| 5,554,982 | A | 9/1996 | Shirkey et al. | |
| 5,589,827 | A | 12/1996 | Scurati | |
| 5,620,155 | A | 4/1997 | Michalek | |
| 5,635,921 | A | 6/1997 | Maxwell et al. | |
| 5,635,925 | A | 6/1997 | Kishi et al. | |
| 5,636,123 | A | 6/1997 | Rich et al. | |
| 5,694,546 | A | 12/1997 | Reisman | |
| 5,699,986 | A | 12/1997 | Welk | |
| 5,757,284 | A | 5/1998 | Trizzino et al. | |
| 5,781,119 | A | 7/1998 | Yamashita et al. | |
| 5,808,560 | A | 9/1998 | Mulanax | |
| 5,847,661 | A | 12/1998 | Ricci | |
| 5,874,892 | A | 2/1999 | Antonellis et al. | |
| 5,889,475 | A | 3/1999 | Klosinski et al. | |
| 5,890,682 | A | 4/1999 | Welk | |
| 5,917,430 | A | 6/1999 | Greneker et al. | |
| 5,920,827 | A | 7/1999 | Baer et al. | |
| 5,926,112 | A | 7/1999 | Hartzell | |
| 5,959,551 | A | 9/1999 | Cardillo | |
| 5,983,161 | A | 11/1999 | Lemelson et al. | |
| 6,011,492 | A | 1/2000 | Garesche | |
| 6,064,319 | A | 5/2000 | Matta | |
| 6,087,961 | A | 7/2000 | Markov | |
| 6,094,148 | A | 7/2000 | Henry et al. | |
| 6,124,825 | A | 9/2000 | Eschenbach | |
| 6,133,867 | A | 10/2000 | Eberwine et al. | |
| 6,151,539 | A | 11/2000 | Bergholz et al. | |
| 6,157,321 | A | 12/2000 | Ricci | |
| 6,160,493 | A | 12/2000 | Smith | |
| 6,178,677 | B1 | 1/2001 | Williams | |
| 6,181,271 | B1 | 1/2001 | Hosaka et al. | |
| 6,188,950 | B1 | 2/2001 | Tsutsumi et al. | |
| 6,218,961 | B1 | 4/2001 | Gross et al. | |
| 6,222,461 | B1 | 4/2001 | Hazen | |
| 6,232,887 | B1 | 5/2001 | Carson | |
| 6,252,519 | B1 | 6/2001 | McKenna | |
| 6,252,520 | B1 | 6/2001 | Asami et al. | |
| 6,252,521 | B1 | 6/2001 | Griffin et al. | |
| 6,252,544 | B1 | 6/2001 | Hoffberg | |
| 6,253,128 | B1 | 6/2001 | Kageyama et al. | |
| 6,265,989 | B1 | 7/2001 | Taylor | |
| 6,268,804 | B1 | 7/2001 | Janky et al. | |
| 6,275,773 | B1 * | 8/2001 | Lemelson et al. | 701/301 |
| 6,292,747 | B1 | 9/2001 | Amro et al. | |
| 6,314,574 | B1 | 11/2001 | Chan | |
| 6,326,903 | B1 | 12/2001 | Gross et al. | |
| 6,339,382 | B1 | 1/2002 | Arbinger et al. | |
| 6,363,325 | B1 | 3/2002 | Bates | |
| 6,411,217 | B1 | 6/2002 | Gabbard | |
| 6,411,896 | B1 | 6/2002 | Shuman et al. | |
| 6,417,782 | B1 | 7/2002 | Darnall | |
| 6,429,812 | B1 | 8/2002 | Hoffberg | |
| 6,462,665 | B1 | 10/2002 | Tarlton et al. | |
| 6,496,107 | B1 | 12/2002 | Himmelstein | |
| 6,529,831 | B1 * | 3/2003 | Smith et al. | 701/301 |
| 6,556,148 | B2 | 4/2003 | Ellis | |
| 6,614,362 | B2 | 9/2003 | Siegel | |
| 6,647,270 | B1 | 11/2003 | Himmelstein | |
| 6,654,689 | B1 | 11/2003 | Kelly et al. | |
| 6,700,504 | B1 | 3/2004 | Aslandogan et al. | |
| 7,113,107 | B2 | 9/2006 | Taylor | |
| 7,212,134 | B2 | 5/2007 | Taylor | |
| 7,382,274 | B1 | 6/2008 | Kermani et al. | |
| 7,508,320 | B2 | 3/2009 | Taylor | |
| 2002/0116117 | A1 * | 8/2002 | Martens et al. | 701/115 |
| 2002/0126022 | A1 | 9/2002 | Ellis | |
| 2003/0122652 | A1 | 7/2003 | Himmelstein | |
| 2003/0141990 | A1 * | 7/2003 | Coon | 340/902 |
| 2003/0169182 | A1 * | 9/2003 | Wilhelm et al. | 340/905 |
| 2005/0057372 | A1 | 3/2005 | Taylor | |
| 2009/0150007 | A1 | 6/2009 | Taylor | |

FOREIGN PATENT DOCUMENTS

| | | | |
|---|---|---|---|
| WO | WO 03/077223 | A1 | 9/2003 |

OTHER PUBLICATIONS

NOAA Weather Radio: About NOAA Weather Radio. Apr. 10, 2000, http://www.srh.noaa.gov/tulsa/nwr.html, p. 1-6.

AlertCast®, Creating the Pathway to Safety: A Promising Future, Feb. 12-14, 2002, p. 1-7.

Canadian Notice ofAllowance from application No. 2,478,255 dated Jun. 2, 2009.

Canadian Office Action from application No. 2,478,255 dated Jun. 2, 2008.

Non-Final Office Action Summary from U.S. Appl. No. 10/383,214 dated Sep. 9, 2004.

Non-Final Office Action Summary from U.S. Appl. No. 10/383,214 dated Oct. 28, 2004.

Final Office Action Summary from U.S. Appl. No. 10/383,214 dated Mar. 9, 2005.

Advisory Action Summary from U.S. Appl. No. 10/383,214 dated Jun. 7, 2005.

Non-Final Office Action Summary from U.S. Appl. No. 10/383,214 dated Mar. 8, 2006.

Notice of Allowance from U.S. Appl. No. 10/383,214 dated May 30, 2006.

Non-Final Office Action Summary from U.S. Appl. No. 10/961,659 dated Feb. 13, 2006.

Non-Final Office Action Summary from U.S. Appl. No. 10/961,659 dated May 18, 2006.

Final Office Action Summary from U.S. Appl. No. 10/961,659 dated Nov. 1, 2006.

Examiner's Answer from U.S. Appl. No. 10/961,659 dated Aug. 22, 2007.

Non-Final Office Action Summary from U.S. Appl. No. 10/961,659 dated Feb. 25, 2010.

Notice of Allowance from U.S. Appl. No. 10/961,659 dated Aug. 24, 2010.

Non-Final Office Action Summary from U.S. Appl. No. 10/961,665 dated May 23, 2005.

Non-Final Office Action Summary from U.S. Appl. No. 10/961,665 dated Nov. 3, 2005.

Non-Final Office Action Summary from U.S. Appl. No. 10/961,665 dated Jan. 30, 2006.

Notice of Allowance from U.S. Appl. No. 10/961,665 dated Jan. 16, 2007.

Non-Final Office Action Summary from U.S. Appl. No. 11/685,017 dated Mar. 3, 2008.

Non-Final Office Action Summary from U.S. Appl. No. 11/685,087 dated May 1, 2008.

Final Office Action Summary from U.S. Appl. No. 11/685,087 dated Nov. 4, 2008.

Notice of Allowance of U.S. Appl. No. 11/685,087 dated Dec. 3, 2008.

Non-Final Office Action Summary from U.S. Appl. No. 12/370,116 dated Jul. 28, 2009.

Office Action Summary from U.S. Appl. No. 10/383,211, which was mailed on Oct. 24, 2005.

Office Action Summary from U.S. Appl. No. 10/383,211, which was mailed on Dec. 9, 2005.

* cited by examiner

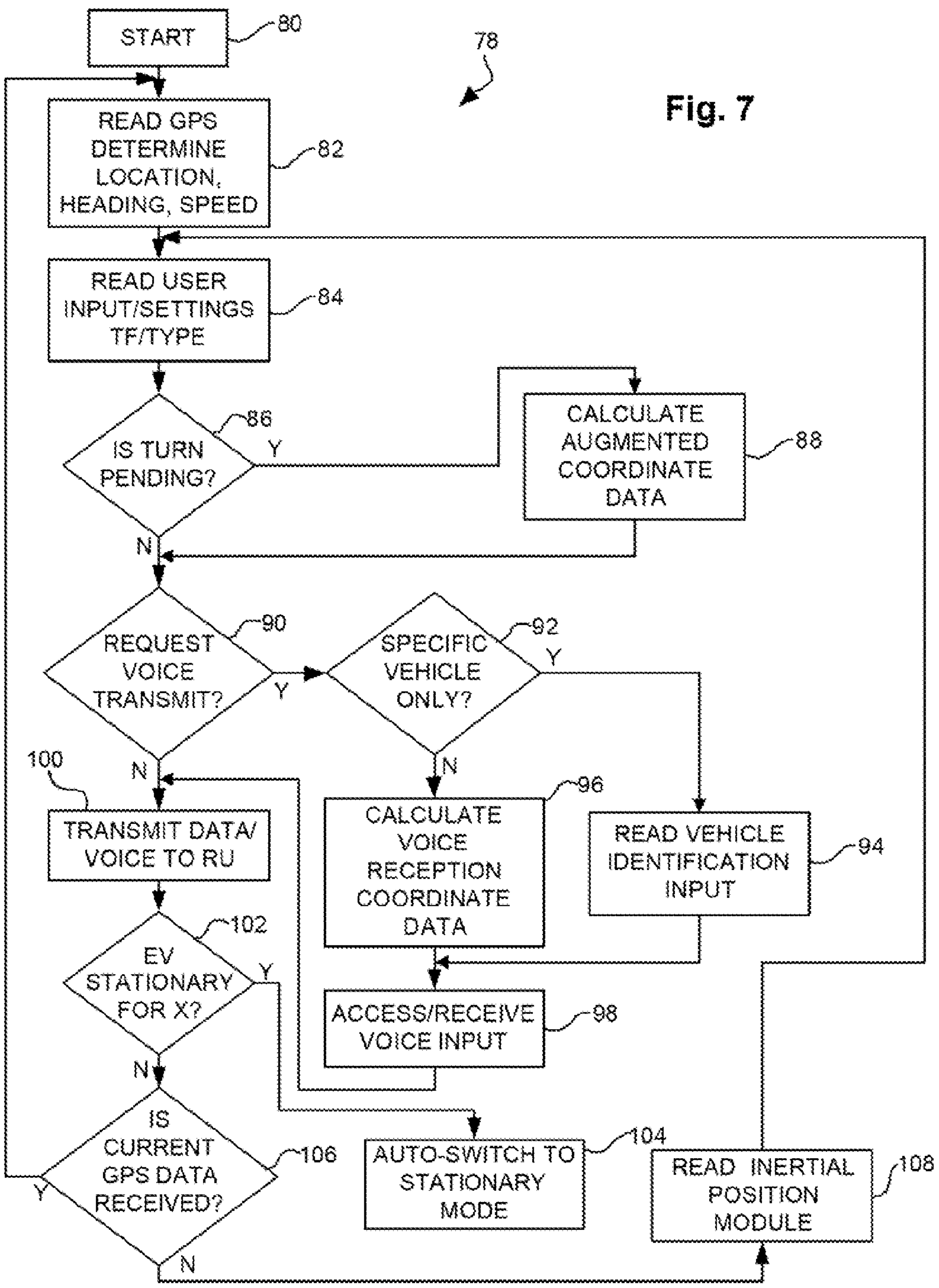
START
80
78
Fig. 7
READ GPS DETERMINE LOCATION, HEADING, SPEED
82
READ USER INPUT/SETTINGS TF/TYPE
84
IS TURN PENDING?
86
Y
N
CALCULATE AUGMENTED COORDINATE DATA
88
REQUEST VOICE TRANSMIT?
90
Y
N
SPECIFIC VEHICLE ONLY?
92
Y
N
100
TRANSMIT DATA/ VOICE TO RU
CALCULATE VOICE RECEPTION COORDINATE DATA
96
READ VEHICLE IDENTIFICATION INPUT
94
EV STATIONARY FOR X?
102
Y
N
ACCESS/RECEIVE VOICE INPUT
98
IS CURRENT GPS DATA RECEIVED?
106
Y
N
AUTO-SWITCH TO STATIONARY MODE
104
READ INERTIAL POSITION MODULE
108

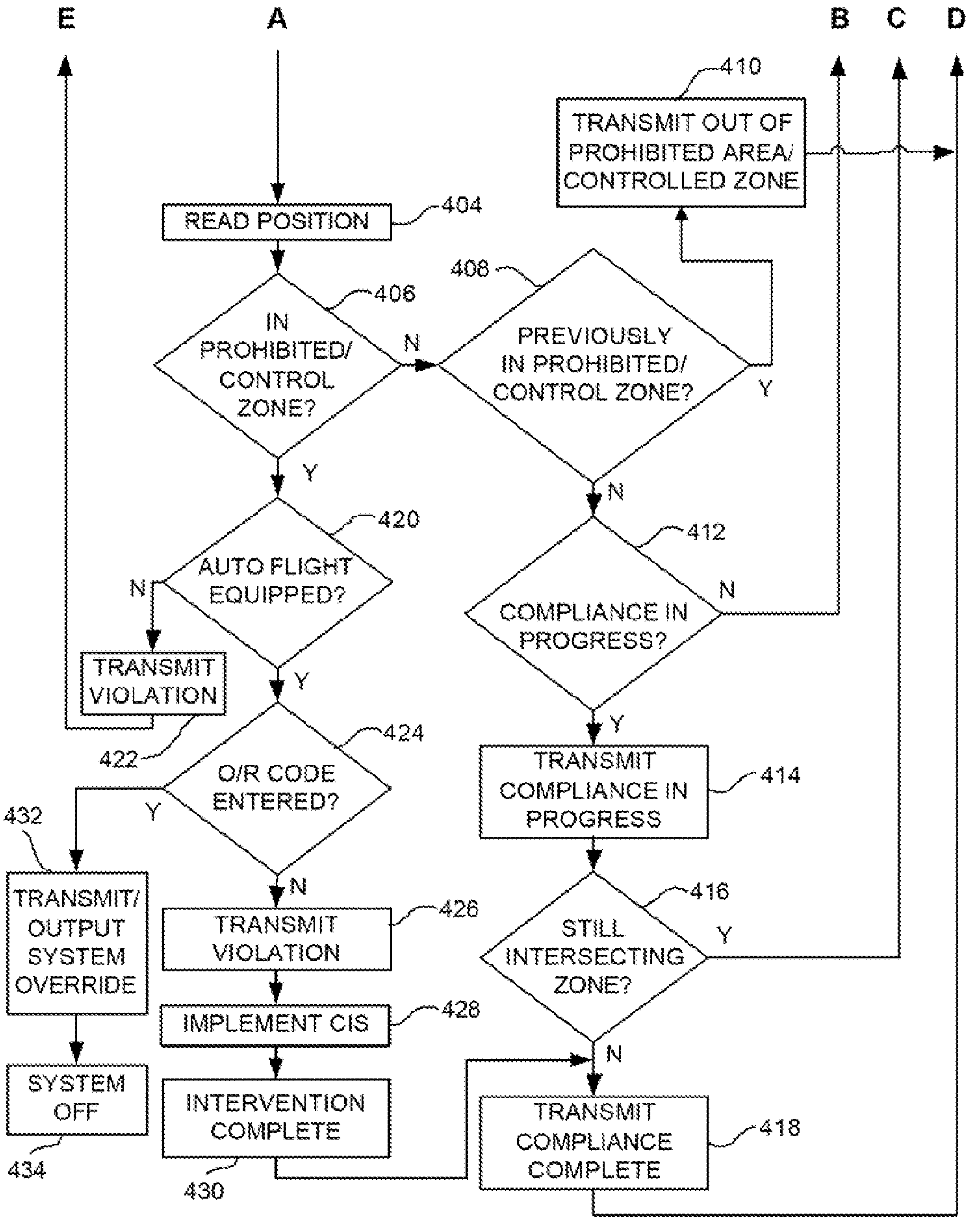
Fig. 18 (contd.)

INTELLIGENT SELECTIVELY-TARGETED COMMUNICATIONS METHODS

PRIOR APPLICATIONS

This application claims priority from. This application is a continuation of U.S. patent application Ser. No. 10/961,659 to Taylor and having a filing date of Oct. 8, 2004; which is a divisional of U.S. patent application Ser. No. 10/383,214 to Taylor and having a filing date of Mar. 5, 2003 now U.S. Pat. No. 7,113,107; which claims priority from U.S. Provisional Patent Application Ser. No. 60/362,609 entitled ACTIVE ALERT SYSTEM AND METHOD, filed Mar. 7, 2002. This application claims priority from each of these applications, all of which are incorporated by reference.

FIELD OF THE INVENTION

The present invention relates to communications systems, and more particularly, this invention relates to a new system and method using geographical position location information for the active delivery of situationally appropriate information.

BACKGROUND OF THE INVENTION

Various forms of warning and control systems and methods have been developed over the years for use and/or control in numerous environments. One area of particular concern which has received attention for a long period of time but without the adoption of any appropriate implementation or solution is a warning with regard to approaching emergency vehicles, such as fire engines, police cars, paramedic and ambulances, and the like. Minutes, even seconds, added to the response time of an emergency vehicle can drastically affect the degree of success of the mission of the vehicle, whether it be assisting accident, heart-attack and stroke victims, firefighting, responding to violent police situations, and so on. The critical response time of such vehicles is severely hampered by one particular major factor; that is the unaware and therefore unresponsive vehicular traffic encountered during the mission between the point of origin and the destination. The drivers of today are more and more audibly isolated and distracted from the outside world with their audio systems and cell phones, not to mention the isolation and distraction caused by them in the ever increasing soundproof vehicles. Unfortunately many drivers simply do not hear the sirens or see the flashing lights of approaching emergency vehicles. Blind intersections, heavy traffic, hearing impaired drivers, and listening to music via head phones or onboard audio systems all contribute to the problem. These drivers and others impair the response in an emergency situation, and even further complicate the problem by not yielding the right of way, making life threatening turns or taking other actions which can dramatically slow or even stop the progress of the emergency vehicle.

Numerous patents have been issued on systems which address some of the foregoing problems. Several examples are U.S. Pat. No. 5,307,060, U.S. Pat. No. 4,403,208, U.S. Pat. No. 4,794,394, U.S. Pat. No. 4,238,778, U.S. Pat. No. 3,997,868, U.S. Pat. No. 6,011,492, U.S. Pat. No. 3,784,970, U.S. Pat. No. 5,808,560, U.S. Pat. No. 6,087,961, U.S. Pat. No. 6,222,461, and U.S. Pat. No. 6,292,747. Although these patents disclose various proposals for warning about the approach of an emergency vehicle, and even some provide control over the range of transmission involved, there is still a basic problem which exists with such systems because of the fact that they broadcast warnings not only to those in the relevant vicinity, but also to many vehicles which are either not in the relevant vicinity or not likely to be affected by the situation, thus further contributing to the tendency to ignore such warnings. Others are limited to vehicle-to-vehicle communications.

Another area only recently gaining in popularity is geographically-specific in-home/business emergency alerts. The technology known as Specific Area Message Encoding (SAME) is now being used by the National Weather Service (NWS) whereby a blanket broadcast is made with each alert containing a particular encoding. The consumer selects the code for his or her particular area and only those NWS notices corresponding to the code are output. However, these specific notices are only output by a NOAA Weather Radio (NWR) into which the user must actively enter the proper code. Further, the particular geographical area, while less than the entire broadcast radius, is still very large. Thus the system is not user-friendly and still leads to overwarning.

The Emergency Alert System (EAS), an automatic, digital-technology upgrade to the Emergency Broadcast System (EBS), is designed to warn the public of a variety of safety related issues—primarily those which pose an imminent threat to life or property. While the original EBS was never used for an actual national emergency it was used thousands of times to warn of local, natural or manmade threats. The EAS digital signal is the same signal that the NWS uses for the previously discussed NWR. The NWS as well as the Federal Emergency Management. Administration and others utilize the system. Under the system, states are divided into one or more Local Areas which are typically comprised of one or two counties. The warnings are distributed to the nation's television and radio broadcast stations and other communications resources, which in turn forward the warnings to the general public via their broadcasting capabilities. As such the geographical area warned can be very large and therefore is inherently imprecise. Furthermore, radios (other than the NWR) or televisions have to be activated for the public to receive the warning. These factors, again, lead to overwarning of those not affected while potentially large portions of the public receive no warning at all.

Law enforcement officials and traffic management personnel constantly struggle with the problems of communicating warnings and advisories to motorists. Permanent and temporary road hazards, problematic intersections, roadway construction and maintenance work zones, traffic situations, uncontrolled railroad crossings, and the newly initiated Amber Alerts are some of the situations where timely and precise warnings to motorists can save time, property and lives. Despite the best efforts of those officials and agencies involved all of the methodology in place today is, to some degree, unsatisfactory, ineffective or inefficient.

Accordingly, a need exists for an active warning system that delivers pertinent, situationally appropriate information, and possibly intervention to those, and preferably only those, likely to be affected by the emergency situation.

What is also needed is a system that enables efficient and effective communication abilities from authorities to any portion of the public, down to an individual vehicle or building.

What is further needed is a system that can in effect predict which vehicles or buildings should receive information based on factors such as velocity (speed) and heading of the target receiver and/or emergency vehicle, etc.

Ideally, what is needed is one standardized system and method to meet all of these needs.

SUMMARY OF THE INVENTION

In accordance with the concepts of the present invention, positional location information, such as from a global positioning system (GPS) is used in a new way. Accordingly, a system and method are provided for vehicle to vehicle communications. In a first embodiment, an emergency vehicle includes a GPS receiver and a wireless communications transmitter. Other vehicles within broadcast range of the emergency vehicle include a GPS receiver and a wireless communications receiver. The GPS circuitry of the emergency vehicle and the other vehicles keep track of the locations of all vehicles at all times. The system of the emergency vehicle sends warning instruction and data signals which cause warnings to be output by those vehicles which are located within a predetermined target area, or "target footprint," and traveling in a direction, and at a speed, which can impede the progress of the emergency vehicle or endanger emergency responders or themselves. In this manner warnings can be targeted precisely, or reasonably so, at those vehicles or others likely to be affected by the path and mission of the emergency vehicle.

According to another embodiment, a system and method for providing a weather advisory tracks a weather event, calculates a target footprint based on the geographical position, velocity and/or heading of the weather event, and transmits data about the target footprint and weather event. A receiving unit receives and processes the transmitted data, determines whether the receiving unit is within or entering the target footprint and, if so, outputs an appropriate advisory. In variations of the embodiments, processing of variables is shifted from the receiving unit to the transmitting unit and vice versa.

Other disclosed applications utilizing the methodology of the present system round out what is a comprehensive in-vehicle, as well as home and workplace, advisory system for use in any situation where an advisory is to be issued to, or otherwise communicated to, the public in a precise and potentially dynamically-changing geographical location, be it large or small.

This is the only system that utilizes the precise, and relative, geographic location of the intended recipient, or target, and its heading (direction of travel/movement) and speed if that is the case, as a screen or filter for the output of a warning or advisory. This provides the recipient with a real-world, real-time, situationally appropriate advisory while virtually eliminating false alarms. Further, this precise targeting, coupled with heading information, can enable control intervention in some applications.

In addition or as an alternative, the concepts of the present invention are useful in warning a surrounding/encroaching vehicle, such as an airplane, automobile, truck or the like, and others, of the vehicle's approach toward a given venue, which may be a hazard site, restricted area, landmark, building or other area(s) to be protected. The system may even take over control of the vehicle or redirect the vehicle away from the site. This can be particularly useful in enforcing established and desired no-fly zones, thus preventing the use of an airplane as a weapon against a protected area.

A method for receiving at least one of advisory information and vehicle control information in a vehicle-mounted system according to one embodiment includes receiving at least one of advisory information and vehicle control information from a transmitting unit using a receiving unit; determining whether the at least one of the advisory information and the vehicle control information is directed to the receiving unit; and if the at least one of the advisory information and the vehicle control information is directed to the receiving unit, outputting the at least one of the advisory information and the vehicle control information.

A method for selectively outputting information based on positional factors according to one embodiment includes receiving a geographic location of a transmitting unit coupled to a first vehicle; receiving at least one of a speed and heading of the transmitting unit; determining a current position, speed and direction of travel of a second vehicle; determining whether the receiving unit is in a target footprint based on the current position of the receiving unit; and if the receiving unit is in the target footprint, determining whether to output information based on at least one of the current speed and heading of the receiving unit.

A system for selectively outputting information based on positional factors according to yet another embodiment includes a receiving unit having: logic for receiving a geographic location of a transmitting unit coupled to a first vehicle; logic for receiving at least one of a speed and heading of the transmitting unit; logic for determining a current position, speed and direction of travel of the receiving unit; logic for determining whether the receiving unit is in a target footprint based on the current position of the receiving unit; and logic for determining whether to output information based on at least one of the current speed and heading of the receiving unit if the receiving unit is in the target footprint.

A method for providing a public safety advisory according to an embodiment of the present invention includes determining a target footprint based upon a geographical position of at least one of an object, event and condition associated with a roadway; and transmitting data about the target footprint to at least one receiving unit; wherein a determination is made as to whether the receiving unit is in the target footprint; wherein a safety advisory is output by the receiving unit if the receiving unit is in the target footprint.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 7 is a flow chart illustrating a transmitting unit (TU) response mode.

BEST MODE FOR CARRYING OUT THE INVENTION

Figure 1:
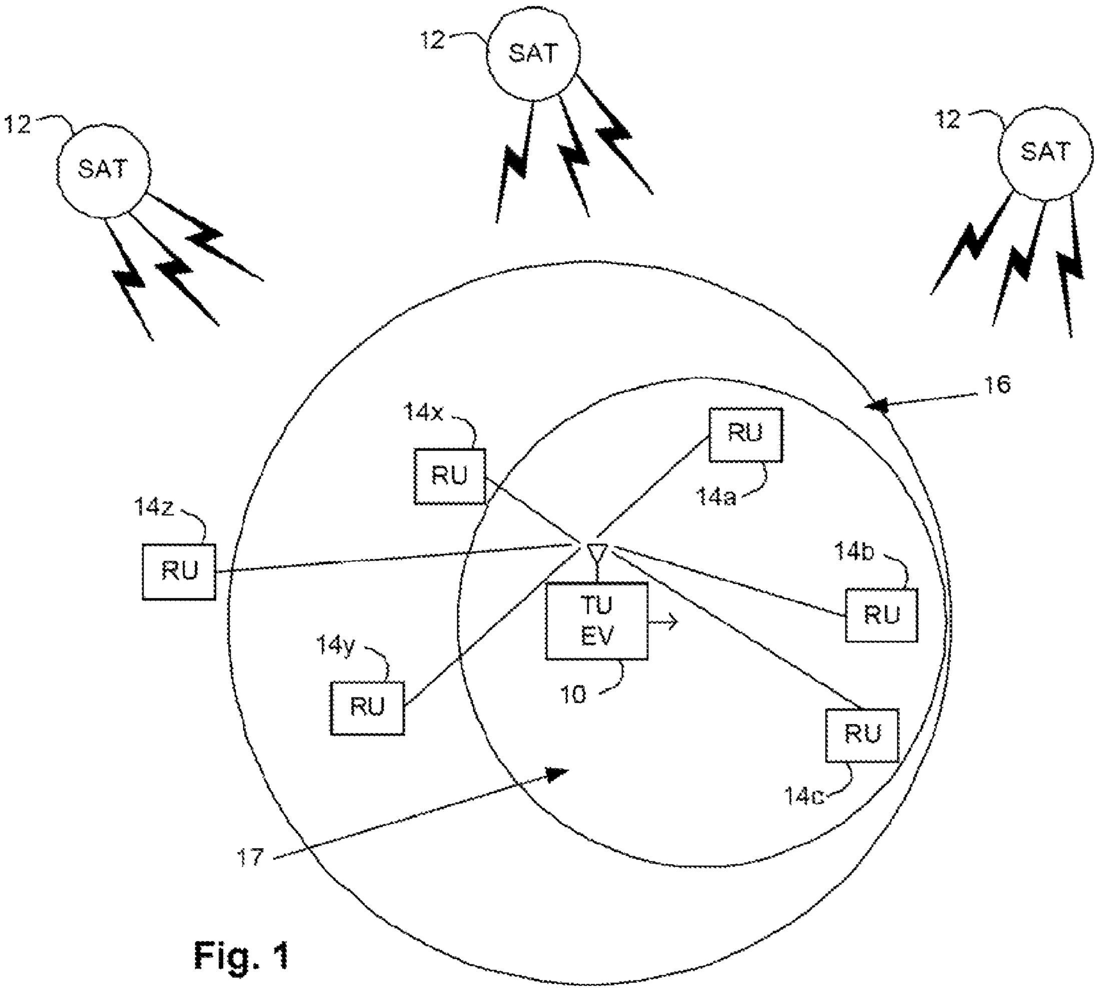
FIG. 1 is a general block diagram illustrating an emergency vehicle and several other vehicles all of which receive GPS location information, and with the emergency vehicle transmitting warning instruction signals to all vehicles in a surrounding area to be potentially acted on only by receiving units in a predetermined and changing target footprint.

The following description is the best embodiment presently contemplated for carrying out the present invention. This description is made for the purpose of illustrating the general principles of the present invention and is not meant to limit the inventive concepts claimed herein.

As will become better understood subsequently, the concepts of the present invention relate to a system and method wherein geographical location information, and direction of travel, or "heading," and speed if that is the case, are utilized to screen the broadcasting or output of advisories and other information by those receiving units located within or coming into a prescribed targeted geographical area. Additionally, as will be discussed later, it also can involve a system and method to intervene and to control/disable a vehicle, such as an automobile or aircraft, which is in or comes into a predetermined location or area.

To enhance the understanding of the many features of the present invention, much of the discussion describes the invention in the context of an emergency advisory system for use in vehicles. Note, however, that the scope of the present invention is not to be limited to use in or as an advisory system, but rather encompasses any and all permutations relating to geographical position-based selective communications to, from, and between mobile and/or stationary units.

According to one preferred embodiment, the present invention provides a broadcast advisory system and related method of operation utilizing geographical location system information, such as that provided by the US Department of Defense Global Positioning System (GPS), Wide Area Augmentation System (WAAS) enabled GPS, The Ministry of Defense of the Russian Federation's GLObal NAvigation Satellite System (GLONASS), or any other system useful for determining two- and three-dimensional geographical position, including all variations and enhancements. For clarity of discussion, any one geographical location system up to all collectively shall be referred to as "GPS".

GPS information can also be coupled with inertial, or relative, positioning capabilities, and heading and speed if that is the case, of both an emergency vehicle, hazard, event, scene, storm, etc. and one or more other vehicles or units which meet predefined criteria, for a transmission from a Transmitting Unit (TU), and the reception and selective output of a targeted, situationally appropriate voice or display, and/or other warning advising the target vehicle or Receiving Unit (RU), of the presence of the emergency vehicle, hazard, etc. and preferably recommending a required, appropriate action.

With this methodology and capabilities, the awareness levels of drivers of all target vehicles of an approaching emergency vehicle (hazard, etc.) approach, and over time, possibly achieve one-hundred percent. Moreover, this awareness can be at a cognitive level, and at a distance previously unattainable with conventional flashing lights and sirens. The probable result is dramatically reduced critical emergency response time for the emergency vehicle while potentially averting a collision between the emergency and target vehicles.

The precise positioning information provides the system of the invention with the ability to direct, or target, and cause to be output a desired advisory (i.e., information, description, warning, or any other type of communication about some subject or event), on a real-world, real-time basis, in only those vehicles or units whose geographical location, and heading and speed if that is the case, are appropriate, i.e., within a defined target area, or "target footprint" (TF), and traveling toward (or with) the emergency vehicle, its path, a hazard, event, scene, etc.

With this system the recipient receives a warning only when needed—when there is a good probability that an emergency vehicle, hazard, event, scene, etc. will actually be encountered. This precision can sustain the credibility of the system, and therefore its effectiveness, by virtually eliminating false alarms and imprecise or useless warnings.

This is the only system that utilizes the precise, and relative, geographic location of the intended recipient, or target, and its heading and speed if that is the case, as a screen or filter for the delivery or the broadcast of an advisory. This provides the recipient with a real-world, real-time, situationally appropriate advisory while virtually eliminating false alarms. Further, this precise targeting, coupled with heading information (i.e., direction of movement), can enable control intervention in some applications. The benefits to both the system operating agency and the recipient of this precise, appropriate information, delivered in a timely manner, are many.

In general, the TU according to a preferred embodiment includes a GPS receiver, wireless transmitter (or transceiver), microcontroller, microphone and related hardware and software/logic. Inertial positioning capabilities preferably can be incorporated to work in conjunction with the GPS receiver for enhanced geographical positioning during those times when GPS data may be insufficient. The transmitter can communicate with a RU via radio frequency or other suitable technology. Note that any transmission medium may be used. For instance, the transmitter can generate a digitally-coded encrypted signal, carrying multiple data topics, capable of reception by the RU within a desired reception area. The signal can be burst transmitted at an appropriate burst rate on a fixed frequency, multi-frequency, frequency-hopping spread spectrum or other technique that optimally minimizes interference and distortion while maximizing the integrity and security of the data packet transmission. Alternative radio frequency technology can be utilized as well. Additionally, a signal can be transmitted or retransmitted from a tower or a satellite. The inertial, or relative, positioning module can include a speed sensor (or can incorporate data from the vehicle speedometer) for detecting distance traveled, and a direction sensor (e.g., a vibration gyroscope) for detecting the angular velocity of changes in the vehicle heading.

In one embodiment, the TU provides GPS coordinate data for determining the size and shape of the target footprint, and its subsections; logic for generating advisory data upon which the RU output is based (i.e., instruction criteria for the RU to use in determining which, if any, warning to select and/or assemble for output, and/or various digital/live voice and/or video advisories, such as a warning library or the warning itself, can be transmitted to the RU); system operator interface to allow on-the-fly modification of the target footprint, and its subsections, and direct live-voice and/or live-video communication with the RU; and a time-out or similar feature to ensure that the transmission does not continue beyond the duration of the mission.

The RU incorporates a GPS receiver, a wireless communications receiver (or transceiver), non-volatile and updateable memory containing a warning library and vocabulary lookup table/dictionary of sufficient size (alternatively, a memory capable of storing the communicated warning library and other information), a microcontroller with related hardware and software/logic, speaker (or vehicle speaker override), display, and other suitable warning indicators. The RU is capable of determining position and heading in terms of GPS coordinates, again augmented with inertial positioning capabilities if desired, receiving and interpreting the data contained in the wireless communication, and playback, or output of the appropriate instructed warning.

One variation on the above-described RU and TU include the TU determining which of the RUs are in the target footprint. The TU can then broadcast data to all of the RUs with instructions as to which RUs should output an advisory. Only an RU receiving an indication that it has been selected would output the advisory.

The system and features of the present invention can be incorporated into telematics systems such as those developed and operated by ATX Technologies, OnStar and the like.

Figure 2:
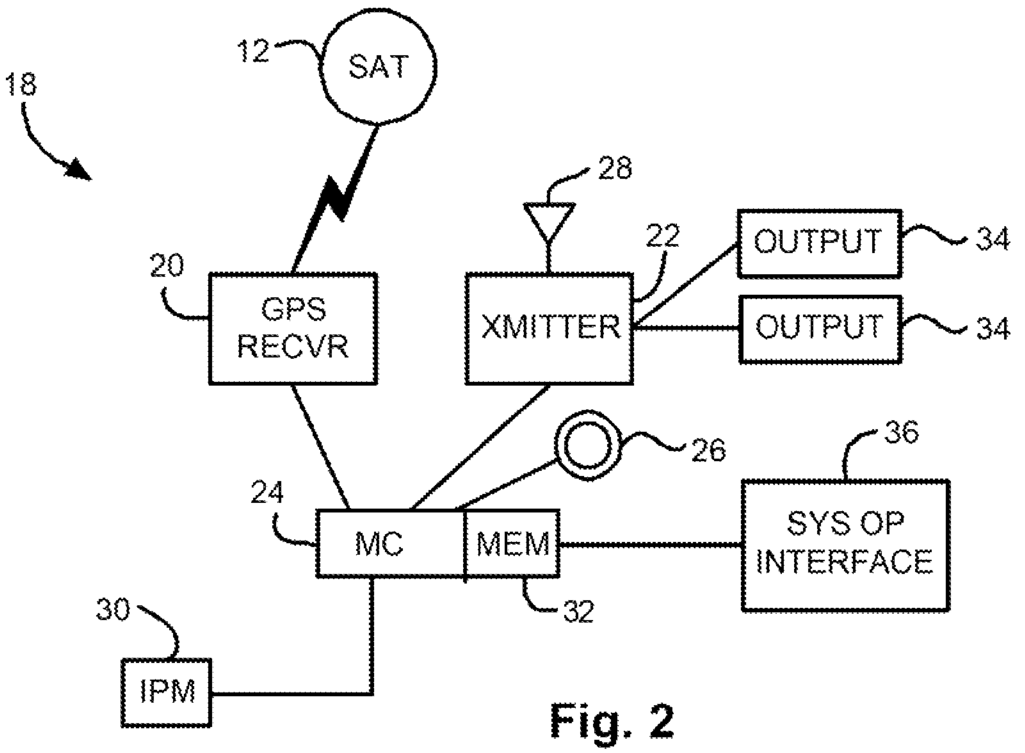
FIG. 2 is a block diagram illustrating an exemplary transmitting unit of an emergency vehicle.
Figure 3:
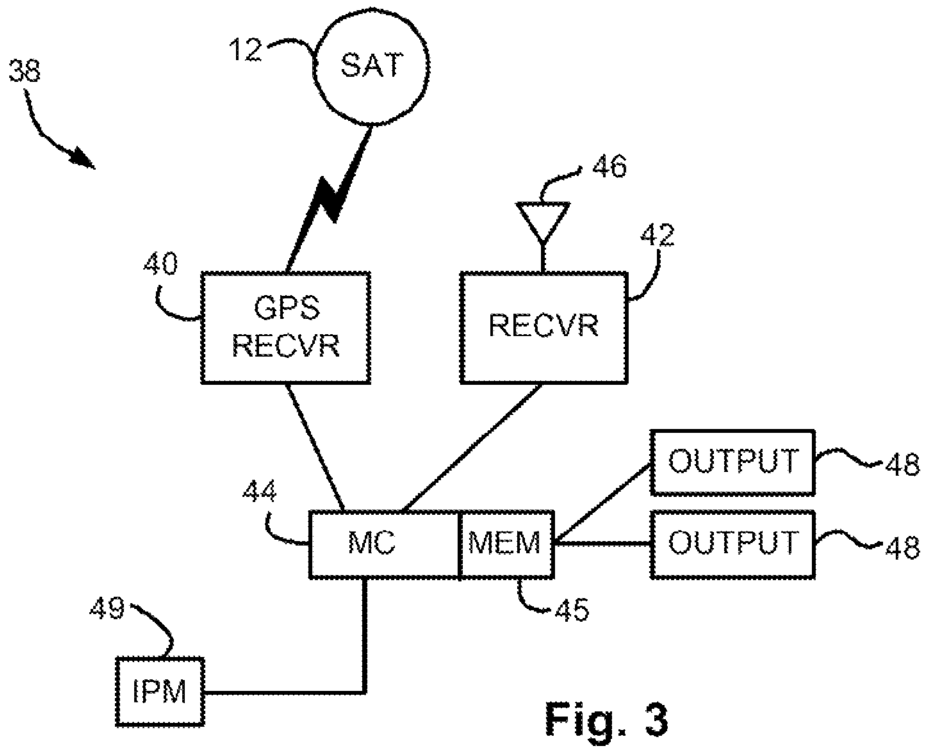
FIG. 3 is a block diagram illustrating an exemplary receiving unit.

Turning now to the drawings, and first to FIGS. 1 through 3, FIG. 1 shows in general form the system and method of the present invention wherein an emergency vehicle (EV) 10 has a TU which receives GPS signals, such as from satellites 12. If the US Department of Defense Global Positioning System is used, the GPS receiver on the TU measures the time interval between the transmission and the reception of a satellite signal from each satellite. Using the distance measurements of at least three satellites in an algorithm computation, the GPS receiver arrives at an accurate position fix. Information must be received from three satellites in order to obtain two-dimensional fixes (latitude and longitude), and four satellites are required for three-dimensional positioning (latitude, longitude and altitude).

As mentioned above, the receiver can also be WAAS-enabled. A WAAS capable receiver improves GPS accuracy to within 3 meters ninety-percent of the time. Unlike traditional ground-based navigation aids, WAAS covers a more extensive service area and it does not require additional receiving equipment. WAAS consists of approximately 25 ground reference stations positioned across the United States that monitor GPS satellite data. Two master stations, located on either coast, collect data from the reference stations and create a GPS correction message. This correction accounts for GPS satellite orbit and clock drift plus signal delays caused by the atmosphere and ionosphere. The corrected differential message is then broadcast through one of two geostationary satellites, or satellites with a fixed position over the equator. The information is compatible with the basic GPS signal structure, which means any WAAS-enabled GPS receiver can read the signal. Other satellite-based augmentation systems such as the European Geostationary Navigation Overlay Service (EGNOS), under development by the European Space Agency, provide similar correction information to GPS and GLONASS signals.

With continued reference to FIG. 1, a plurality of vehicles with RUs 14*a*-14*z* are shown, each of which also receives GPS signals from the satellites 12. An area 16 indicates the reception area (RA) of the TU transmission, and a smaller area 17, being a subset of area 16, indicates a programmed, calculated, or selected, target footprint (TF). According to the system and method of the present invention, the TU of the emergency vehicle 10 transmits warning and RU control instruction and data signals which are received by all RUs 14*a*, 14*b*, etc., located within the reception area 16. Although these signals are received by RUs outside of the TF 17, such as indicated by RUs 14*x* and 14*y*, the system of the RU does not output a warning unless the RU is located within the TF and, optionally, other criteria are met as well. RU 14*z* is not within the reception area 16 and, therefore, does not receive the transmission from the TU. The above is accomplished, as will become better understood later through a consideration of FIGS. 4, 5 and 6, by the TU sending the instruction and data signals to a specific and moving geographical area 16 which are acted upon only by RUs located within a defined subset area 17, and preferably when additional criteria are also met.

FIG. 2 illustrates an exemplary TU 18 of the emergency vehicle 10 and includes a GPS receiver 20 for receiving position information from the satellites 12 and a wireless transmitter, or transceiver, 22 for transmitting the warning instruction and data signals to the RUs in the reception area 16 (FIG. 1). The GPS receiver 20 and transmitter 22 operate under the control of a microcontroller 24 (processor, ASIC, etc.) which includes appropriate hardware and software/logic and a microphone 26 which allows the emergency vehicle operator to provide voice commands or warning statements to those vehicles within selected areas of TF 17 (FIG. 1). The transmitter 22 also includes a transmission antenna 28. An optional inertial positioning module 30 can be included to provide inertial positioning capabilities. Note that the microcontroller can also provide the inertial positioning capabilities.

Additional optional equipment on the TU includes a memory 32 for, among other things, storing warning statements and the like that can be sent to the RUs. An output device 34 such as a speaker, visual output device, and/or tactile device can also be included to allow the TU to also function as a RU. The TU can also include a system operator interface 36.

FIG. 3 is a system diagram illustrating an exemplary RU 38 that likewise includes a GPS receiver 40, and also includes a wireless communications receiver, or transceiver 42, and a microcontroller 44 (processor, ASIC, etc.), including appropriate hardware, memory (RAM, ROM, etc.) 45, and software/logic, for controlling the RU. The memory can be used to store information received from the TU, a warning library, etc. The receiver also includes a reception antenna 46, and the microcontroller is coupled to one or more output devices 48 which can be a separate warning loudspeaker, the speaker or speakers of the RU vehicle car stereo system, a visual output device (flashing lights, LCD display, etc.) and/or a tactile device such as a vibrating wheel or seat for the hearing impaired, merely to alert the driver or other occupant, etc. An optional inertial positioning module 49 can be included to provide inertial positioning capabilities. Note that the microcontroller 44 can also provide the inertial positioning capabilities.

Procedure and Methodology

The TU and the RU work in concert to cause the RU to output an appropriate advisory when the situation warrants.

Other than the relative locations and headings of the two (which each have the ability to determine by way of the GPS receiver) the data necessary to produce a warning are:

1. Calculation of the target footprint and its subsections,
2. Applying the criteria to determine if a warning is to sound,
3. Selection of the warning to be output.

There are design alternatives to accomplish the above. The major variables are the duties of the respective units and the amount of data to be contained in the TU transmission. To maintain the system's effectiveness and to keep it robust, it is preferable for the RU to possess a resident warning library and lookup table for the selection, or assembling, of the appropriate warning to be issued. The TU then transmits that data necessary for determining the target footprint, criteria for a warning to sound and information for the selection or assembling of the warning (including a non-cataloged or updated warning if needed). The RU processes the information and selects, or assembles, the warning from the resident warning library or lookup table. The procedure and methodology described as follows is based upon this concept although other design alternatives exist.

The following describes a primary embodiment. Additional embodiments and/or options of the system are discussed later.

Target Footprint

The transmitting units can be programmed by the system developer in conjunction with the utilizing agency (fire, police, EMS, highway patrol, etc.) with approximate or precise target footprint configurations, including appropriate subsections, for all possible emergency vehicle routes within the unit's operational area. Upon initial deployment of the system a complete roadway survey of the emergency vehicle's operational area is performed utilizing mapping software, field work, or both, to determine the optimal TF configuration for the three operational modes (Response, Turning and Stationary), for any given location and heading of the EV taking into consideration the roadway network, geographical features, types of adjacent development, etc. near the EV or RUs. For example, the appropriate TF configuration can be established and programmed for each three-hundred foot segment of roadway (or as conditions dictate) so that the TF is updated, or refreshed, each time the EV has traveled this distance. In this manner, a precise TF can be employed reflecting the real-world conditions to ensure the highest level of operational effectiveness while not disturbing those motorists who cannot affect, or who will not be affected by, the emergency mission.

Figure 4:
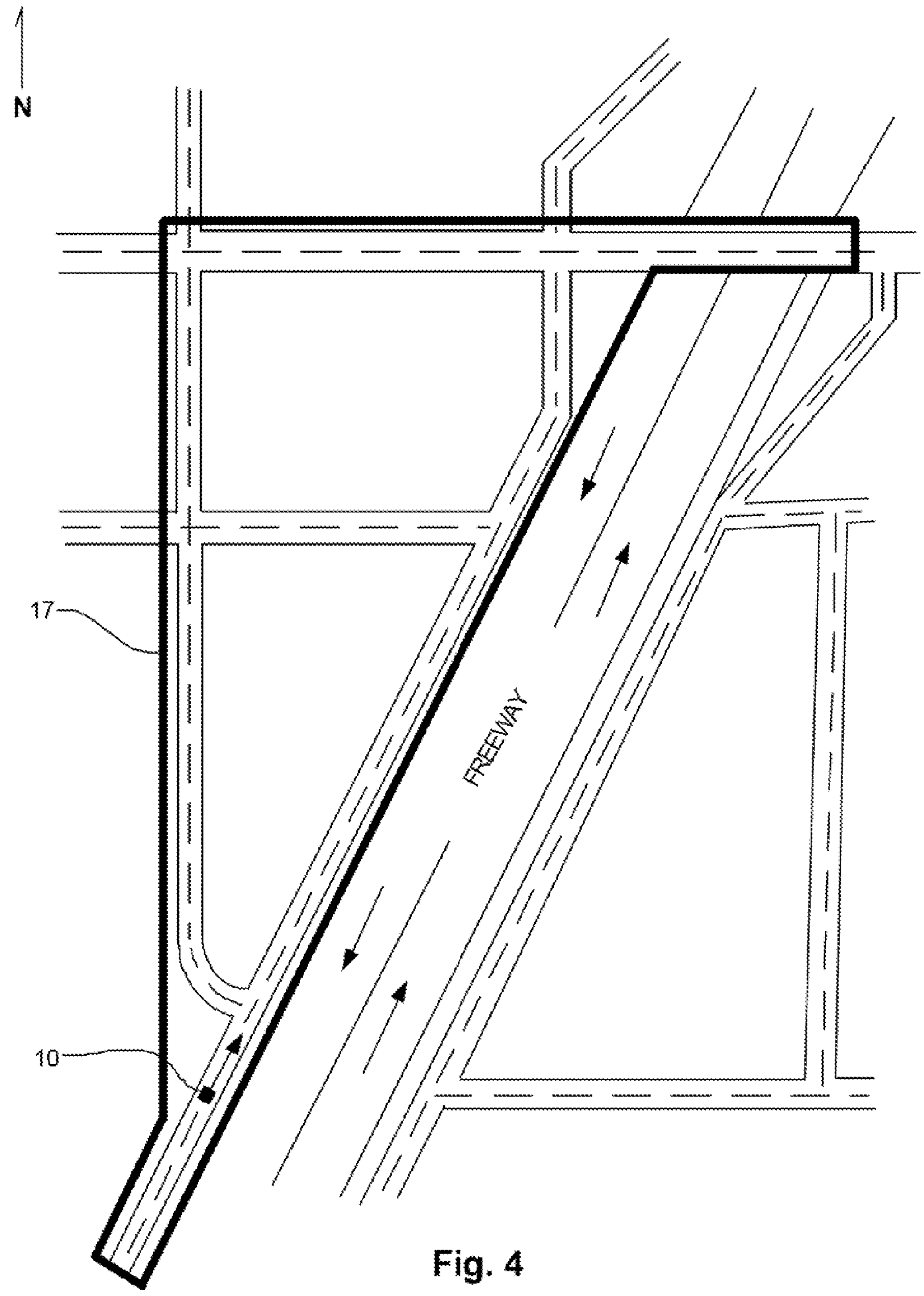
FIG. 4 is a diagram illustrating a programmed target footprint at a given point in time for an emergency vehicle at a particular location and traveling in a certain direction.

Turning to an example illustrated in FIG. 4, an emergency vehicle 10 is traveling north-northeast on a surface street which is adjacent to a freeway and approaching the intersecting roadways as shown. For the EV's current coordinates and heading, a target footprint 17 has been established encompassing the area shown. This configuration takes into account the existing real-world conditions as previously discussed and includes all vehicles which have the potential to intersect the EV, while excluding vehicles (such as those on the freeway or at any point east of the freeway) which do not. As the EV continues on its course areas will fall out of the target footprint while additional programmed areas will be added as dictated by the roadway network, etc, encountered.

As discussed, the RU vehicle's location within the TF is only one element in determining if a warning is to sound in the RU vehicle. As will be better understood later through consideration of FIG. 5, the illustrated TF shown in FIG. 4 can be further divided into subsections, or areas, wherein the RU vehicle heading, and speed, become additional factors in this determination.

Figure 5:
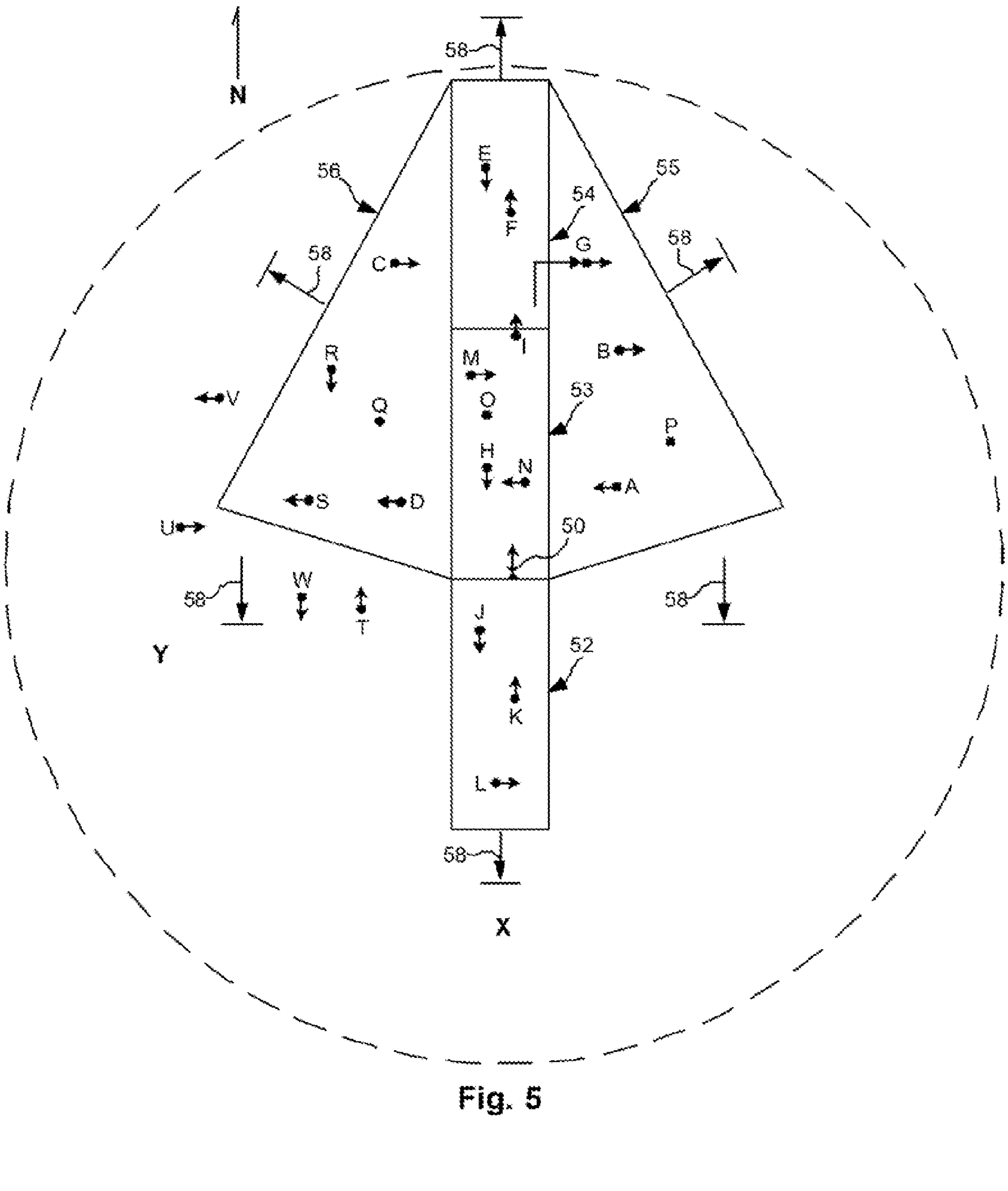
FIG. 5 is a diagram illustrating a standard, or fixed, target footprint, along with an emergency vehicle traveling in one direction and numerous other vehicles traveling in diverse directions.

In the alternative, selections from various "standard", or fixed TFs (such as that illustrated in the Response Mode Operational Example, FIG. 5), which also provide the necessary protection with minimal false advisories, can be utilized for those areas where it is appropriate, or areas not mapped and programmed.

System updating can be performed as necessary to include newly constructed or modified roadways, etc.

Emergency Vehicle:

Following is an illustrative scenario in accordance with a preferred embodiment.

1. Upon embarking on the mission the EV system operator activates the present automated system, similar to the activation of lights and siren. The option for the operator's input of the type of mission (fire, medical, police response, high speed pursuit, etc.) will be available, in addition to other inputs which can change the selected target footprint (TF), potential warning content (or, in the alternative, the transmitted warning library), etc.

2. The transmitting unit (TU) immediately reads the GPS receiver which provides an initial location of the EV, its speed, and direction of travel, or heading.

3. The GPS receiver process continues throughout the mission so that the TU is constantly updating the location, heading and speed of the EV. As previously discussed, when the TU does not receive satisfactory GPS signals the inertial positioning module, if present, can provide this information until good GPS signal data are again received.

4. The TU selects the appropriate TF which will include those coordinates a certain distance fore, aft and laterally to the heading of the EV. The configuration of the TF will vary by EV location, heading and speed, type of mission, local conditions, etc., and is modifiable on-the-fly by the system operator. The optimal shape and dimensions of the TF(s) are determined by the system developer in conjunction with the agency utilizing the system.

5. The TU then transmits what can be a digitally-coded, encrypted radio signal capable of being received within the reception area (RA). This signal carries numerous data topics including one or more of:

a. Data necessary for the RU to calculate the TF and its subsections.

b. The actual bounds of the TF.

c. Warning instruction criteria for the RU to determine if a warning is to be output and for the selection, or the assembling, or for direct output, of the appropriate warning statement.

d. RU reprogramming information for update of warning library and/or unit functionality, to be applied if needed.

As an alternative, in lieu of the RU possessing a stored warning library and vocabulary lookup table/dictionary, the TU transmission can also include numerous digitalized warnings (such as audio and/or video in a warning library) to be received by the RU. These warnings are assigned an identification code and stored in the RU memory for retrieval and output if conditions warrant.

Based upon subsequent determinations made by the RU (see discussion below) the precise, appropriate warning is retrieved from memory and output or "played" in the target vehicle, if warranted.

All Other Vehicles:

Following is another illustrative scenario in accordance with a preferred embodiment.

1. All receiving units (RU) in vehicles within the prescribed reception area receive the warning instruction and data transmission from the TU.

2. The RUs, having been activated when the vehicle was started, have continually monitored their location, heading and speed by way of the GPS receiver. As with the TU, this data can be provided by the inertial positioning module, if present, during those intermittent periods when good and valid GPS data are not received.

3. The RU interprets and processes the data contained in the TU transmission. If any of the instructed criteria (a combination of relative location and heading), are met the vehicle becomes a target vehicle (TV) and an appropriate warning or voice communication is output in the vehicle and other suitable warning indicators are activated.

4. As long as a vehicle is within the RA, thus receiving the TU transmissions, the RU will continue to monitor and process this data to determine if its status changes and take the appropriate action if it does.

As a result those motorists who are affected by the emergency operation are properly alerted (again, at a very high cognitive level, and at a proper and safe distance) to the approaching emergency vehicle, while other non-affected motorists remain undisturbed by unnecessary advisories and false alarms. Moreover, the alerted motorists are provided with warning information that is precise in nature thereby enabling them to take appropriate actions and precautions. Traffic delays are thereby minimized, thus enhancing emergency response-time, while the possibility of a collision between the emergency vehicle and others is significantly reduced.

Response Mode Operational Example

Turning now to an example illustrated in FIG. 5, the emergency vehicle is traveling north and has activated the system in response mode. Upon doing so the transmitting unit on board the EV 50 determines, via GPS positioning, that it is located at coordinates (X, Y) and that it is traveling north (a heading of 0 degrees). The TU then transmits the warning instructions and data which are received by all vehicles within the reception area (in this example an area with a radius of approximately 3,000 feet).

Data in the TU transmission include the information necessary for the RU to calculate the target footprint (in this example a standard TF) and its subsections 52-56 as shown in FIG. 5. Based upon this coordinate data the RU determines if its vehicle is located within the TF. If so, the RU may be instructed to sound the appropriate warning.

For any warning to sound, the vehicle must be located within the TF and have a certain direction of travel, or heading (and speed as discussed later) thus becoming a target vehicle. Otherwise, no warning is output.

Warning Criteria—Processing and Results)

The following warning conditions are processed by those receiving units within the RA, with the results as shown:

Condition 1. If the RU calculates its location to be within the defined set of coordinates shown as area 55, and the heading is westerly (any heading more west than north or south)—in this example this would be any heading greater than [0 (EV's heading)+225] degrees [SW] and less than [0+315] degrees [NW]—then mute or override any active audio system and output Warning "1".

Vehicle A: Its location is within the coordinates shown as area 55. Direction of travel is westerly—a heading shown here of 270 degrees (within the defined range of 225 to 315 degrees), thus intersecting the EV's path. Warning 1, preceded by an alert signal, e.g., three graduated tones, is output.

Warning 1 in this case may be: "Driver alert. An emergency vehicle (ambulance) is approaching your direction of travel ahead on your left, that is, ahead on your left. Please be aware and prepare to pull over and stop."

Vehicle B: Its location is within the coordinates shown as area 55. However, heading is not westerly. No warning is output. Vehicle B's RU continues to monitor its position and the TU's transmission to determine if it subsequently meets the criteria (as modified over time) until it moves out of the RA and no longer receives the transmission.

Condition 2. If the RU calculates its location to be within the set of coordinates shown as area 56, and the heading is easterly (again, intersecting the EV's path), then output Warning "2".

Vehicle C: Location is within the coordinates shown as area 56. Heading is easterly. Warning 2 is output.

Warning 2 may be: "Driver alert. An emergency vehicle (ambulance) is approaching your direction of travel ahead on your right, that is, ahead on your right. Please be aware and prepare to pull over and stop."

Vehicle D: Is within area 56 but does not meet the easterly heading criterion. No warning is output. RU continues to monitor for change of status.

Condition 3. If the RU calculates it location to be within the set of coordinates shown as area 54, and the heading is southerly (at a distance, but traveling directly toward the EV, from the front) then output Warning "3".

Vehicle E: Is within area 54 and heading is southerly. Warning 3 is output.

Warning 3 example: "Driver alert. An emergency vehicle (ambulance) is approaching you from directly ahead, that is, from directly ahead. Please be aware and prepare to pull over and stop."

Condition 4. If the RU calculates it location to be within the set of coordinates shown as area 54, and the heading is northerly (at a distance, and traveling the same direction as the EV), then output Warning "4".

Vehicle F: Is within area 54 and heading is northerly. Warning 4 is output.

Warning 4 example: "Driver alert. An emergency vehicle (ambulance) is approaching you from behind, that is, from behind. Please be aware and prepare to pull over and stop."

Vehicle G: Previously received Warning 4, but has now changed direction of travel to the east. New heading does not warrant a warning. A cancellation notice, as discussed later, is output in the vehicle.

Condition 5. If the RU calculates its location to be within the set of coordinates shown as area 53, and the heading is southerly (traveling directly towards the EV immediately in front of it) then output Warning "5".

Vehicle H: Is within area 53 and its heading is southerly. Warning 5 is output.

Warning 5 example: "Driver alert. An emergency vehicle (ambulance) is approaching you immediately ahead, that is, immediately ahead of you. Please cautiously pull to the right and stop until it passes."

Condition 6. If the RU calculates it location to be within the set of coordinates shown as area 53, and the heading is northerly (traveling the same direction as the EV immediately in front of it), then output Warning "6".

Vehicle I: is within area 53 and heading is northerly. Warning 6 is output.

Warning 6 example: "Driver alert. An emergency vehicle (ambulance) is immediately behind you, that is, immediately behind you. Please cautiously pull to the right and stop until it passes."

Condition 7. If the RU calculates it location to be within the set of coordinates shown as area 52, and the heading is northerly (approaching the EV from the rear), than output Warning "7".

Vehicle J: Is within area 52 but does not meet the northerly heading criterion. No warning is output. RU continues to monitor for change of status.

Vehicle K: Is within area 52 and heading is northerly. Warning 7 is output.

Warning 7 example: "Driver alert. You are approaching an emergency vehicle (ambulance) from behind. Please stay a safe distance behind the emergency vehicle. Do not attempt to pass it."

Vehicle L: Is within area 52 but does not meet the northerly heading criterion. No warning is output. RU continues to monitor for change of status.

Condition 8. If the RU calculates its location to be within the set of coordinates shown as area 53, and the heading is easterly, westerly, not ascertainable or stationary, then output Warning "8".

Vehicles M, N and O: M and N are located within area 53 but traveling perpendicular to the path of the EV. It is likely that Vehicle M will have traveled beyond the EV's path before the EV reaches it unless the path of the EV angles to the east, which it may. Vehicle N is in a location which creates a real and immediate danger to itself and to the EV. Vehicle O is stopped at a traffic signal. Vehicles H and I, because of their heading, are already being instructed to output a specific Warning. However, all vehicles within area 53 including Vehicles M, N and O need to output a Warning. Warning 8 is output.

Warning 8 (default) example: "Driver alert. You are in the immediate vicinity of an approaching emergency vehicle (ambulance). Please be aware and prepare to pull over and stop."

Condition 9. If the RU calculates its location to be within the set of coordinates shown as areas 52, 54, 55 or 56 and the heading is not ascertainable or vehicle is stationary then output Warning "9".

Vehicle P: Is within area 55. Good and valid GPS data is being received showing that the vehicle is stationary. The RU determines, however, that it is not located within the lateral distance (pursuant to the speed criteria as discussed later), of the EV path for stationary or slow moving vehicles to output a warning. No warning is output. RU continues to monitor for change of status.

Vehicle Q: Is within the area 56. Good and valid GPS data is not being received to ascertain the heading or speed. Warning 9 is output.

Warning 9 (generic) example: "Driver alert. You are in the vicinity of an approaching emergency vehicle (ambulance). Please be aware."

Miscellaneous Vehicles

Vehicles R and S: Both vehicles are within the TF area 56. Their heading, however, does not warrant a warning. The RUs in both vehicles are monitoring the TU transmission to determine if their status changes.

Vehicles T, U, V and W: These vehicles are within the RA but not within the TF 52-56. The RUs in these vehicles are receiving and monitoring the transmission to determine if their status changes.

Cancellation Notice

When the status of the vehicle changes from a target vehicle back to a non-target vehicle (such as due to change of heading of the EV or the TV, as in the case of Vehicle G turning from area 54 to area 55) a cancellation notice can be output. Also, in this regard, the warning status of the RU may "time-out" if it does not receive a subsequent TU transmission within a predetermined interval. This can occur when the TV travels beyond the RA (or the RA travels away from the TV) or the EV system operator turns the system off. In either case above a cancellation notice is preferably output and the audio system is restored.

An illustrative cancellation notice can be: "Driver alert is cancelled. Thank you for your attention."

Speed Criterion

The configuration of the TF coupled with the RU location and heading criteria eliminates the vast majority of unaffected vehicles from outputting an undue warning. However, the possibility of a vehicle that poses no threat to the emergency mission, such as one pulling into a parking lot, garage, etc., receiving a warning will still exist. In determining whether a warning shall be output in slower, more remote vehicles it is beneficial to include the additional criterion of speed in the logic process. Even minor acceleration or deceleration of either the RU vehicle or the EV, can have a significant effect on the potential intersection probability of the two over short distances. However, it can be demonstrated that target vehicles located beyond certain distances laterally to the EV, and traveling on a intersecting path with the EV at lower speeds have little or no possibility of encountering the EV.

For example, assume that an emergency vehicle is traveling north at 60 mph on a major arterial and has activated the present system. A passenger vehicle is located 900 feet north and 600 feet east of the present EV position traveling west at 10 mph, thus on a 90 degree intersection path with the EV. This information, at this point in time, establishes a theoretical intersection point for the two vehicles, as well as the time interval for each vehicle to reach it. At the present speeds the EV will reach this point in 10.2 seconds and the passenger vehicle in 40.9 seconds—a difference of a full half-minute. By the time the passenger vehicle reaches the intersection point the EV will be over a half-mile past the point. It will require a significant change in the speed of one or both vehicles to make the intersection of the two a possibility.

To help alleviate these situations, speed-based criteria can be incorporated in the RU and/or TU functions, whereby those vehicles located beyond a certain lateral distance, e.g., 500 feet, from the path of the EV, (and if they are receiving good and valid GPS or inertial positioning data) a threshold speed of 20 miles per hour, for example, must be achieved and sustained for a minimum interval before a warning is output. Once the vehicle is within the 500-foot lateral zone the standard criteria can apply regardless of speed. Vehicle A and Vehicle Q on the Response Mode Operational Example (FIG. 5) illustrate this principle. In this regard, this lateral zone can be incorporated as an additional target footprint subsection(s).

Alternatively, if the system development were to include the EV transmitting its location, heading and speed (which it can) with the other warning instruction data, the RU, if beyond the described lateral zone, can calculate the theoretical intersect time of the two vehicles. In this manner, if the algorithm showed that the time to intersect was over a predetermined threshold interval, such as 25 seconds or other desired time period, or that the EV will pass the intersect point ahead of the target vehicle by a suitable margin, no warning is output.

In either example above, those vehicles which have already output a warning but are now stopped at a traffic signal for example, or whose heading has changed because of a winding roadway, or otherwise (and thus increased the theoretical intersect time beyond the threshold), would not output a cancellation until a suitable timeout interval had passed.

Additional Features

The foregoing operational example illustrates the utilization of a standard (as opposed to the previously discussed "programmed") target footprint. In this example the boundaries of the TF are, of course, continually moving in the direction of the EV's travel. Should the EV turn, the TF is initially augmented (see Turning Mode discussion), then turns with it. Further, the size and dimensions of the TF (particularly areas 53 and 54) can be adjusted on-the-fly by the system operator as the situation warrants. Large arrows 58 on FIG. 5 show the anticipated directions of adjustment of the other TF subsections or areas. Control settings on the TU operator interface can be used to adjust the size and shape of the TF within the parameters of the reception area with a lighted display on the TU indicating the primary dimension of the major sectors of the TF.

As shown, the TU can also transmit, at a lesser rate than the warning criteria and other data, a data package updating the warning library and/or unit functionality, to be implemented as necessary. If a warning or system change had occurred since the RU was manufactured or last upgraded, the RU would apply these changes. For example, the TU can instruct the RU to assemble from the lookup table, and save, a newly implemented or substituted warning. In this manner any RU that eventually falls within the reception area of an activated TU would be automatically updated. System upgrades can also be accomplished at dealer service centers and other locations.

The TU can be set to automatically switch to Stationary Mode when the EV has quit moving for a predetermined interval. This continues to provide the warning protection needed (without unduly disturbing non-affected motorists) in the event that the EV has reached the mission's destination and the system operator has failed to manually switch the system to Stationary Mode, or off.

It is important to minimize (to the point of total mitigation) any distraction to the driver. All audio systems are preferably overridden and muted once the vehicle has qualified for a warning (and remain so until the warning has been cancelled or expired), then as previously shown, three tones graduated in scale and volume precede the actual warning. The warning can announce anything deemed appropriate and/or give additional instructions to the driver. The RU can repeat warnings at a predetermined interval, e.g., every 5 to 10 seconds, but warning is preferably output immediately when the type of warning changes. As previously discussed, lights on the target vehicle control dash, as well as other non-audible warning indicators including a text display and/or tactile devices for the hearing impaired, etc. can be activated as well.

The automatically-generated TF area settings, and the warning selection or assembly instructions (or the transmitted warning library if the alternative of having the TU transmit the warning library is selected for deployment), can be different for all other anticipated applications of the system, such as a high or low-speed pursuit, law enforcement responding to a scene, portable unit deployment in highway construction zones, and the like.

The system can include a system operator's override for those vehicles positioned within area 53, or any other area. This override enables the system operator to communicate directly to these vehicles via live-voice using any appropriate technology. Further, a person at a third location, such as at a dispatch center or in a helicopter, can communicate directly with the target vehicle and/or EV.

The warning library and vocabulary lookup table can include other selected languages as well (e.g., for tourists), and particularly those languages prevalent to the population within its operational locale. The RUs can have a language preference selection capability whereby the warnings can be heard in English and/or an alternate language.

Turning Mode Operational Example

Figure 6:
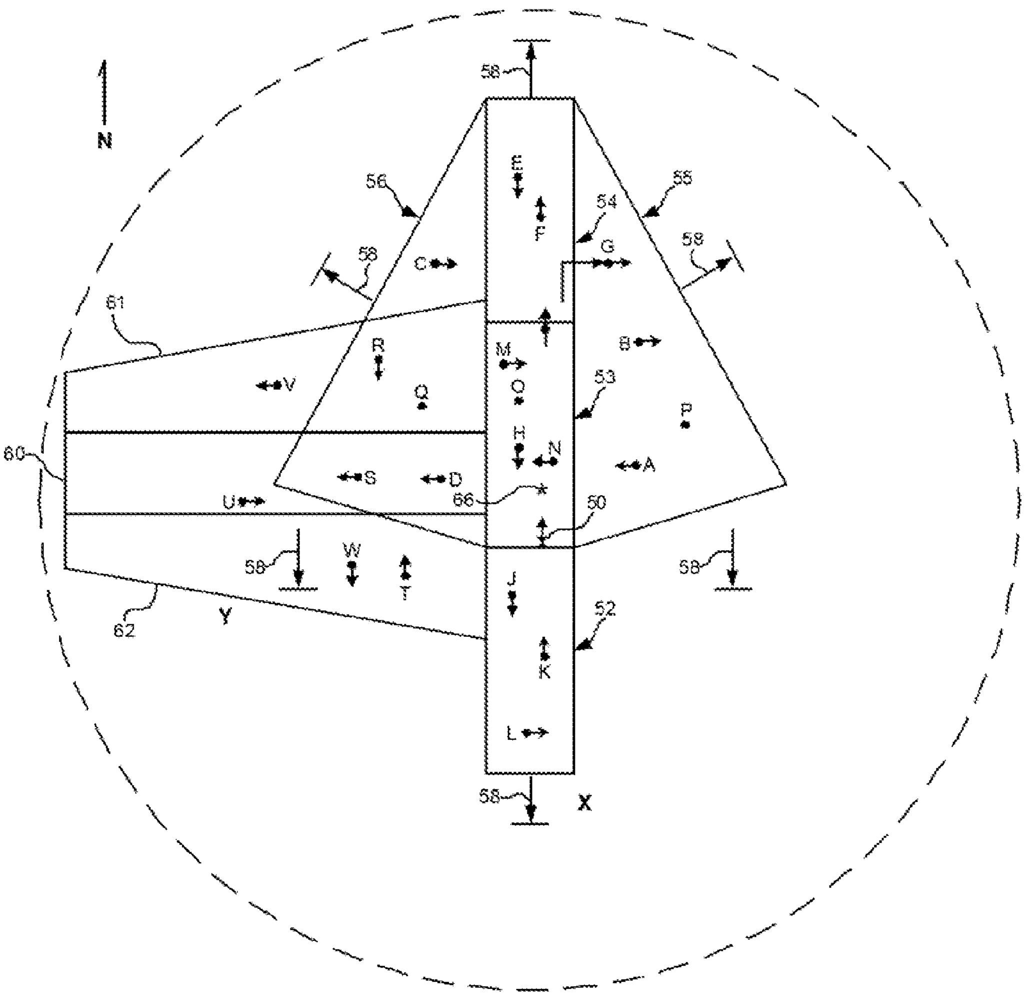
FIG. 6 illustrates a modification of the target footprint in the event the emergency vehicle is to make a turn, and illustrates the changing nature of the target footprint.

FIG. 6 shows a modification of the target footprint of FIG. 5. A turn-signal interface causes the TU to transmit new data based upon the indicated direction of a pending turn. When the EV operator is anticipating a turn and activates the vehicle's turn-signal (or other control), e.g. 200 to 300 feet from the intersection, the TU processes and transmits instructions to augment the TF with subsections 60 through 62 as shown and instruction criteria for output of an appropriate warning in the TV. The original TF is preferably not abandoned until the turn is completed.

Those vehicles which are converging upon the new "pending direction" (in this case, west) of the EV, or in the immediate proximity and traveling toward, or with, the new pending direction, become target vehicles and thus output an appropriate warning. When the turn is completed and the turn-signal automatically switches off, a new programmed TF is implemented. When utilizing a standard TF as shown here, the same would again be implemented pointing in the new direction (90 degrees to the west in this case).

As an example, assume that the emergency vehicle operator is going to make a left turn at the next intersection and activates the turn-signal at point 66 approximately 250 feet from the turn. The TF is immediately and automatically augmented to include those areas shown at 60-62. Vehicles within these areas, all having been within the original reception area, have been monitoring the TU transmissions. The augmented warning instruction criteria are processed by the RU as discussed previously with the effects upon the individual vehicles as follows:

Vehicles D, R and S: All were located within the TF under the previous transmissions but their direction of travel did not warrant the receipt of a Warning. Now, however:

Vehicle D is close (within area 60) and traveling in the same direction as the EV's pending direction.

Vehicle R is converging upon the pending direction from the north (within area 61).

Vehicle S is also close (within area 60) and traveling in the same direction as the pending direction.

Thus, all now become target vehicles and an appropriate warning is output in all three vehicles.

Vehicles T and U: Neither was within the original TF but both are now within the augmented TF. The heading of both vehicles, in relation to the EV's pending direction, warrants a warning.

An appropriate warning is output in both Vehicle T and Vehicle U.

Vehicle V: Was not within the original TF but is within the augmented TF. The heading is same as the EV however the vehicle is not in close proximity to the EV's pending direction (not within area 60).

Vehicle V does not output a warning.

Vehicle W: Was not within the original TF but is within the augmented TF. Its heading, coupled with its location (in area 62) does not warrant a warning.

No warning is output in Vehicle W.

An appropriate, generic warning in this case might be: "Driver Alert. An emergency vehicle (ambulance) is making a turn toward your immediate vicinity. Please be aware."

The warnings are preferably more specific to the situation (as those shown in the FIG. 5 example) once the EV has completed the turn, the new TF (programmed or standard) is established, and the new warning instruction criteria are transmitted and processed.

Stationary Mode

Upon the emergency vehicle reaching its destination, and if the situation is warranted, the system operator can then switch the system to stationary mode (or as previously discussed the system is automatically switched to stationary mode in the event the system operator fails to do so). This stationary mode can be one of the most beneficial applications of the present system. Law enforcement, fire and EMS personnel constantly struggle to control traffic at a scene both for the protection of the personnel themselves as well as the motorist unknowingly converging upon the scene. Examples of this are any operation where personnel are working in hazardous situations along or near the roadway such as:

Law Enforcement Officers issuing citations or rendering assistance.

Firefighters working on vehicle or structure fires and extrications.

EMS personnel aiding victims of accidents.

Traffic accident or crime scene investigation.

Road repair (as described under the section entitled "Work Zones."

The stationary mode operation continues the advisory warning process of the system but with a more limited target footprint (e.g., along the roadway alignment, 150 feet in width by 2,500 feet in length with the EV in the center, or other suitable configuration), again to be coupled with the appropriate vehicle heading requirement so that only those vehicles converging upon the stationary location of the EV receive the warning. The TF can, as in the Response Mode, be programmed for the exact EV location and be adjustable at the system operator's discretion. A different set of warnings can also be utilized. A basic warning may be: "Driver alert. You are approaching the scene of law enforcement personnel (or emergency personnel) activity directly ahead. Please be aware, lower your speed to X mph and prepare to stop if needed."

The TU transmission can also include instructions to output a more urgent warning if the RU determines that the target vehicle speed is too fast for the conditions. In such an embodiment, the RU can be integrated with a speedometer system of the target vehicle and/or determine speed using the GPS receiver.

Specific Vehicle Communication

The previously described receiving unit (RU) possesses the ability to receive wireless communications, apply criteria, and utilize the existing audio speakers in the target vehicles. These characteristics, coupled with vehicle identification information can give agencies the ability to communicate with a specific vehicle much like the previously discussed system operator's live-voice override. When conducting a vehicle pursuit, law enforcement typically gets close enough to determine the vehicle's license plate number (certainly the agency's helicopters have the ability to get it if the pursuing officer cannot). This information, when incorporated in an "if" portion of the warning instruction criteria can provide direct, albeit unilateral, voice communication with that specific vehicle.

For example, if the license number of the targeted vehicle is input into the TU by the system operator (via keypad, digital license plate reader, voice recognition software or other means), the TU transmission can instruct the RU (which knows its own identification number and/or vehicle's license number) in that vehicle—and only that vehicle—to broadcast the live-voice or live-video transmission. This direct speech communication can be from another driver (via a TU or RU in the other driver's vehicle), a system operator or, more probably, patched through from the agency's offices where trained personnel can communicate directly with the driver, thus potentially "talking down" the situation before it becomes violent, or ends tragically.

This optional function would require a somewhat enhanced TU—one capable of accepting the license plate information—but would require no enhancements to the previously described RU. However, an enhanced RU equipped with an in-vehicle microphone and transceiver (similar in principle to those vehicles currently equipped with telematic features) would enable two-way communication between the TV and the EV.

An alternative way to accomplish this is via GPS location. A transceiver in the RU is capable of transmitting its location (and/or serial number) back to the TU. The TU can then identify the RU and send a message particular to that RU.

An additional development option can include an engine control interface, or "kill-switch", whereby an authorized agency can shut down the engine of the offending vehicle and/or control its brakes, acceleration, steering, etc. if it was deemed to be a threat to public safety, for example.

Permanently Installed and Portable Stationary Unit Applications

As discussed, the present system can be a comprehensive in-vehicle driver warning/communication system with precise targeting capabilities that can provide most, if not all, needed advisories to motorists. Following are additional applications made possible by the utilization of stationary transmitting units.

Road Hazards

The present system's methodology described in the Stationary Mode application can also be employed for hazardous road conditions—including temporary roadway hazards. Permanent and portable stationary units can be installed at the types of locations such as dangerous curves, dips, freeway off-ramps, blind spots, weather and quake-damaged roadways, areas of dense fog, high winds, etc., similar to the electronic warning signs now installed at some locations, but with more flexibility, effectiveness and ease of installation which can maximize deployment opportunities. Use of this system to provide predetermined warnings, and/or the in-vehicle output of a transmitted live or recorded voice message at these locations can be much more cognitively effective (and cost-effective) than the electronic warning signs now in use. Permanent transmitting units (or properly located permanent transmitters controlled from a remote center) can be installed for activation as the conditions warrant in those areas periodically encumbered by dense fog or high winds. In this application an appropriate target footprint can be selected according to the situation. The instructed warning can be specific for installation at permanent hazards, or generic for expeditious placement at temporary roadway hazards. Either, or both, can also include instructions to output a more urgent warning if the RU determines that the target vehicle speed is too fast for the conditions.

Intersection Advisories

Similar in nature to the above described application the present system can be utilized at those signalized intersections (or any signalized intersection) which have demonstrated a high incidence of red light violations and/or accidents caused by such violations. In this application the TU would be permanently installed on and interface with the signal controller. It would broadcast instructions (based upon whether the light is already red or yellow, or the time remaining until a signal change to yellow or red is scheduled) that may then be acted upon by a RU in a vehicle approaching the intersection within an appropriate target footprint and subsection. The RU would determine its location, heading, and speed and would warn the driver if a potential "running" of the existing or imminent red light were indicated. Again, a more urgent warning would output as the potential for a violation remained, or increased over time. Inattentive, impaired or distracted drivers are thus provided a highly effective, situationally appropriate warning that could help prevent these often-deadly accidents. The same methodology can be utilized at intersections equipped with conventional stop signs where a safety issue has been demonstrated. This could provide an economical solution to a hazardous intersection condition until the expensive process of signalizing the intersection is warranted or possible.

Work Zones

Portable units utilizing the present system's targeted methodology placed or installed at the scene of roadway work can significantly improve the safety environment of these workers and the motorists traveling through these zones. As previously shown drivers encountering these sensitive areas are then verbally warned of the situation ahead. This warning may be at a high cognitive level which should be superior to the existing system of signs, flags, etc., which can be blocked from view by adjacent vehicles or not observed at all by impaired, or sleeping, drivers.

Effective variable speed limits (VSL) in work zones systems are of extreme interest to the Federal Highway Administration. It has stated that systems that "incorporate other innovative technologies that, when coupled with VSL, potentially improve flow and safety in work zones are encouraged (e.g., advanced hazard warning, etc.)"

Traffic Advisories

The present system can also be employed by traffic management control centers in urban environments and elsewhere. System operators in these centers can utilize the system to notify motorists converging upon an event (such as major gridlock, a traffic accident and the like), of the situation much the same as they use electronic messaging signs today. In this regard, the actual transmitters for the TU can be placed at locations as necessary for the reception area coverage required and system operators at remote traffic management centers can select the appropriate target footprint, RU heading criteria and the advisory to be transmitted.

As an example, assume that a tractor-trailer has overturned on the transition ramp of the I-10 freeway to the 405 freeway blocking all freeway lanes. Officials do not expect the situation to be cleared for two hours. A targeted advisory of this occurrence can be transmitted to all traffic on the I-10 converging on this location, advising motorists of the situation, and encouraging them to use alternative routes. The system operator can also, via live-voice or recorded message, suggest which alternative routes the motorist should use, and provide other useful information as well. As in the above discussions, the present system utilizes precise targeting and a situationally appropriate advisory to the benefit of both officials and motorists.

Uncontrolled Railroad Crossings

In this application, the transmitting unit of the present system may either be permanently installed at the crossing or in the train itself. In either case the TU can be automatically activated as the train approaches the crossing. Data defining the target footprint, as delineated by the intersecting roadway(s), and the warning instruction criteria may be permanently stored in the TU and retrieved (by electronic identification of the specific crossing in the case of the train-mounted TU) for transmission at the appropriate time. Thus, motorists within the TF, and traveling in the direction of the crossing, would receive the appropriate warning. Enhancements include transceiver-equipped RUs transmitting their location back to the train for screen display, and/or audible/visual/tactile warning to the engineer in the event a vehicle is blocking the crossing.

Enhanced Embodiments and Development Options

Increasingly public agencies are equipping their vehicles with GPS based Automatic Vehicle Location (AVL) systems and on-board navigation systems with a screen display. Additionally, more and more passenger vehicles are equipped with a suite of GPS based features including visual screen-based navigation systems. It is expected by many in the field of telematics that it is just a matter of a few years when all passenger vehicles come equipped with telematics systems.

Considering the above, some enhancements and development options are discussed below:

1. Should the system be developed and deployed utilizing standard (rather than programmed) target footprints, the system operator (probably auxiliary personnel in the EV) can elect to override the predetermined, automatically generated TF and adjust the boundaries of the TF based upon the mapping display showing the actual street layout. This provides a more appropriate and precise TF more properly reflecting the real-world conditions.

2. As regards the RU vehicle, the same screen display that provides the mapping-navigation for these vehicles can display the location of the subject EV in relation to the vehicle's location. Additionally, this screen (or optional panel as previously discussed) can display the communication in text form for the hearing impaired.

3. An additional enhancement to the system can include a transceiver in the RU for transmission of the target vehicle's location, heading and speed back to the TU. The TU can include a screen display (with or without the incorporation of the on-board navigation discussed above) showing, not only the target footprint, but the position, heading, and speed of only those target vehicles (thus minimizing screen clutter and system operator distraction) whose proximity and heading are such that they pose an immediate danger to the EV and themselves. This enables the EV operator to take appropriate action. Further application of the transceiver-equipped RU principle can assist the EV operator in avoiding areas of extreme traffic congestion in favor of alternative routes.

There are many driver assistance and vehicle communication systems currently under development and with the improvements in GPS and communications technology there may be no end to what will be available in information and assistance systems in the automobiles of the future. Because of the anticipated speed of the development of this product, and no expensive public infrastructure requirement, the system can be produced as a stand-alone system and/or bundled with other existing systems that are deployed, or near deployment (such as Automatic Vehicle Location (AVL), Automatic Crash Notification (ACN) systems, and the like).

The present system, as regards the receiving unit's functions, can be incorporated into existing telematics system suites (e.g., OnStar, ATX Technologies, etc.), in the near term.

Transmitting Unit (TU) and Receiving Unit (RU) Operational Examples

Turning again to the drawings, FIGS. 7 through 10 illustrate flow charts which show the sequence of steps and the operation of a TU in different modes and applications, and of a basic vehicle RU, according to exemplary embodiments of the present invention.

FIG. 7 depicts the process 78 executed by a TU in response mode. The process begins at operation 80, upon activation of the TU by a system operator in the emergency vehicle. An integrity test is performed, and a system update can be performed if requested. The GPS receiver, and inertial positioning module if present, is preferably always activated.

In operation 82, the GPS data is read and used to determine one or more of location, heading, speed, and time. Note that some of these features can also be determined by other means, such as heading from a compass, speed from the speedometer, time from a clock, etc. In operation 84, any user input/settings are read. Also, the target footprint, type of mission, and other input are determined.

In decision 86, a determination of whether a turn is pending or upcoming is performed by checking the turn-signal or other input (and/or the mapped route as generated by mapping software, if present). If a turn is pending, the augmented coordinate data for the turning mode TF is calculated in operation 88.

If no turn is pending, the process continues on to decision 90. At decision 90, it is determined whether a voice (live or recorded) transmission has been requested by a system operator. If not, the process proceeds to operation 100, described below.

If a voice transmission is requested, a determination is made at decision 92 as to whether the voice transmission is to be directed to a specific vehicle or vehicles only. Specific vehicle identification input is read in operation 94, and in operation 98, voice input is accessed/received from a microphone, patch-through, etc. and sent to the particular RU in operation 100. If no specific vehicle is specified, coordinate data for the voice reception area is calculated in operation 96. Voice input is accessed/received from a microphone, patch-through, storage, simulation program, etc. in operation 98 and sent to the RUs in operation 100.

If voice transmission has not been requested at decision 90, data is transmitted to the RU in operation 100. Note that only data, only voice, or both data and voice can be sent to the RU.

In decision 102, a determination is made as to whether the EV has remained stationary for a predetermined interval. If so, the TU automatically switches to stationary mode in operation 104 (See FIG. 9). If not, the process proceeds to decision 106, in which GPS reception is checked to verify that the GPS data received is current, valid data. If the GPS data is current, the process loops back to operation 82.

If the GPS data is not current and valid, an inertial positioning module, if present, is read in operation 108. Again, the location, heading, speed, time, etc. are determined. A warning is emitted to a system operator that the TU is operating off inertial positioning data (thus advising operator that nearby vehicles may also not be receiving good GPS data). The process loops back to operation 84.

The process ends when the TU is deactivated such as by switch off, or the unit is manually switched to Stationary Mode.

Figure 8:
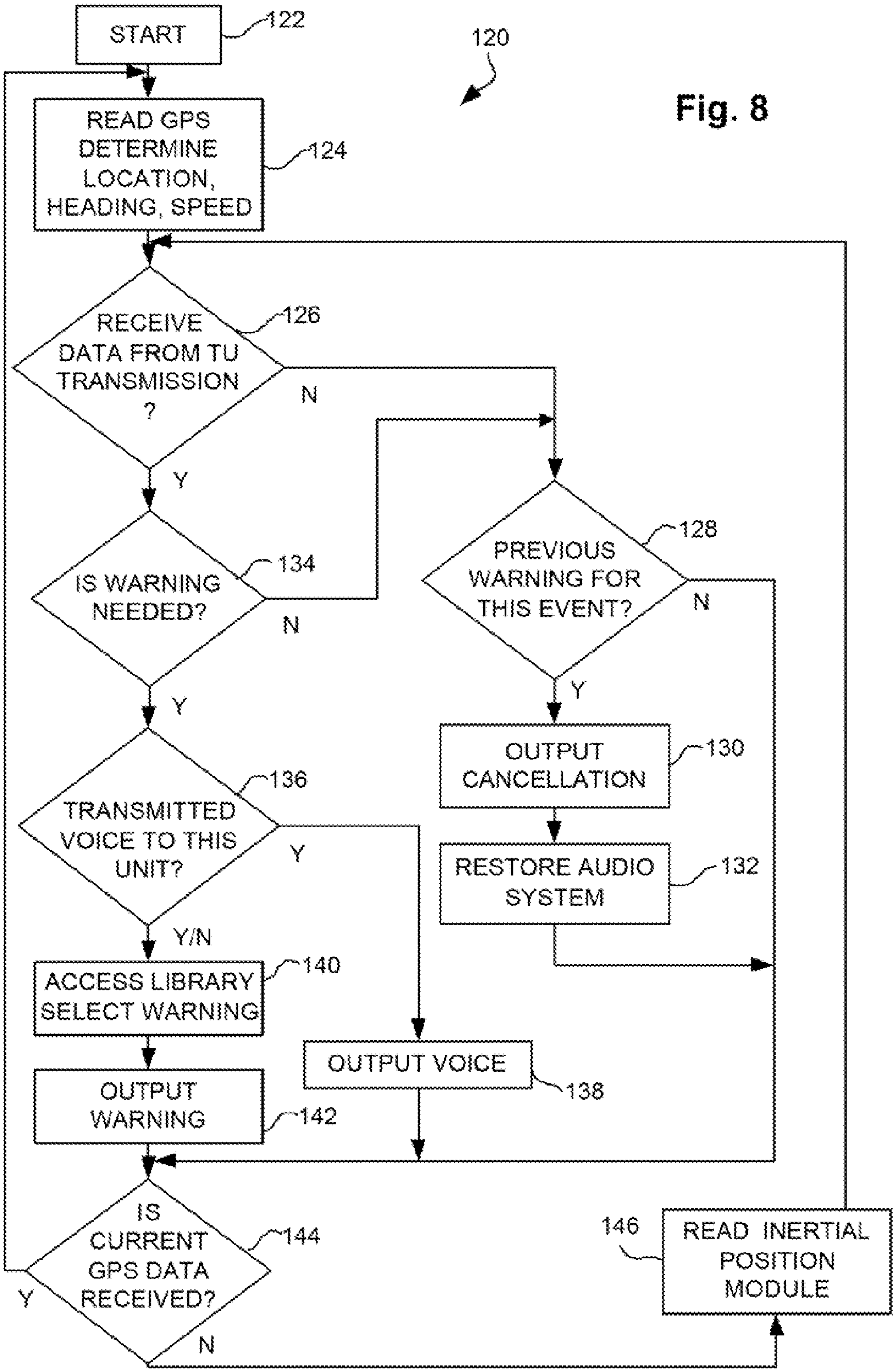
FIG. 8 is a flow diagram illustrating operation of a basic receiving unit (RU).

FIG. 8 illustrates a process 120 executed by an RU. In operation 122, the unit is activated such as by vehicle power on, and an integrity test is performed. A system update is performed by a service center or other means if requested. GPS data is read in operation 124, and location, heading, speed, time, etc. are determined.

In decision 126, it is determined whether data transmission from a TU has been received. If so, the process proceeds to operation 134. If not, a determination is made in decision 128 as to whether a previous warning has been output in the vehicle for this event. If no previous warning has been output for this event, the process advances to operation 144. If a previous warning has been output for this event, a cancellation notice is output in operation 130, and the audio system is restored in operation 132. The process then advances to operation 144.

If data is received from a TU at decision 126, the data is saved and/or processed. A determination is made in decision 134 as to whether the instructions call for a warning, or transmitted voice, to be output. If not, the process proceeds to operation 128, discussed above. If so, at decision 136 it is determined whether this unit is to receive and output transmitted voice. If voice is to be output, the audio system is overridden, volume reduced or muted, if activated, and the transmitted voice is received and output in operation 138. Voice reception and output are maintained until the link is terminated by the sender such as by microphone switch off then the process advances to operation 144 (see below).

A warning can also be selected and output in operations 140-142. In operation 140, a warning library and/or lookup table is accessed and a warning is selected and/or assembled. In operation 142, the audio system is muted if activated, and the warning is output. Note that operations 138-142 are not exclusive of each other and can be performed together.

The process proceeds to decision 144, in which GPS reception is checked to verify that the GPS data received is current and valid. If the GPS data is good, the process loops back to operation 124.

If the GPS data is not current and valid, an inertial positioning module, if present, is read in operation 146. Again, the location, heading, speed, time, etc. are determined. The process loops back to operation 126.

The RU is deactivated by vehicle power off or manual power off

Figure 9:
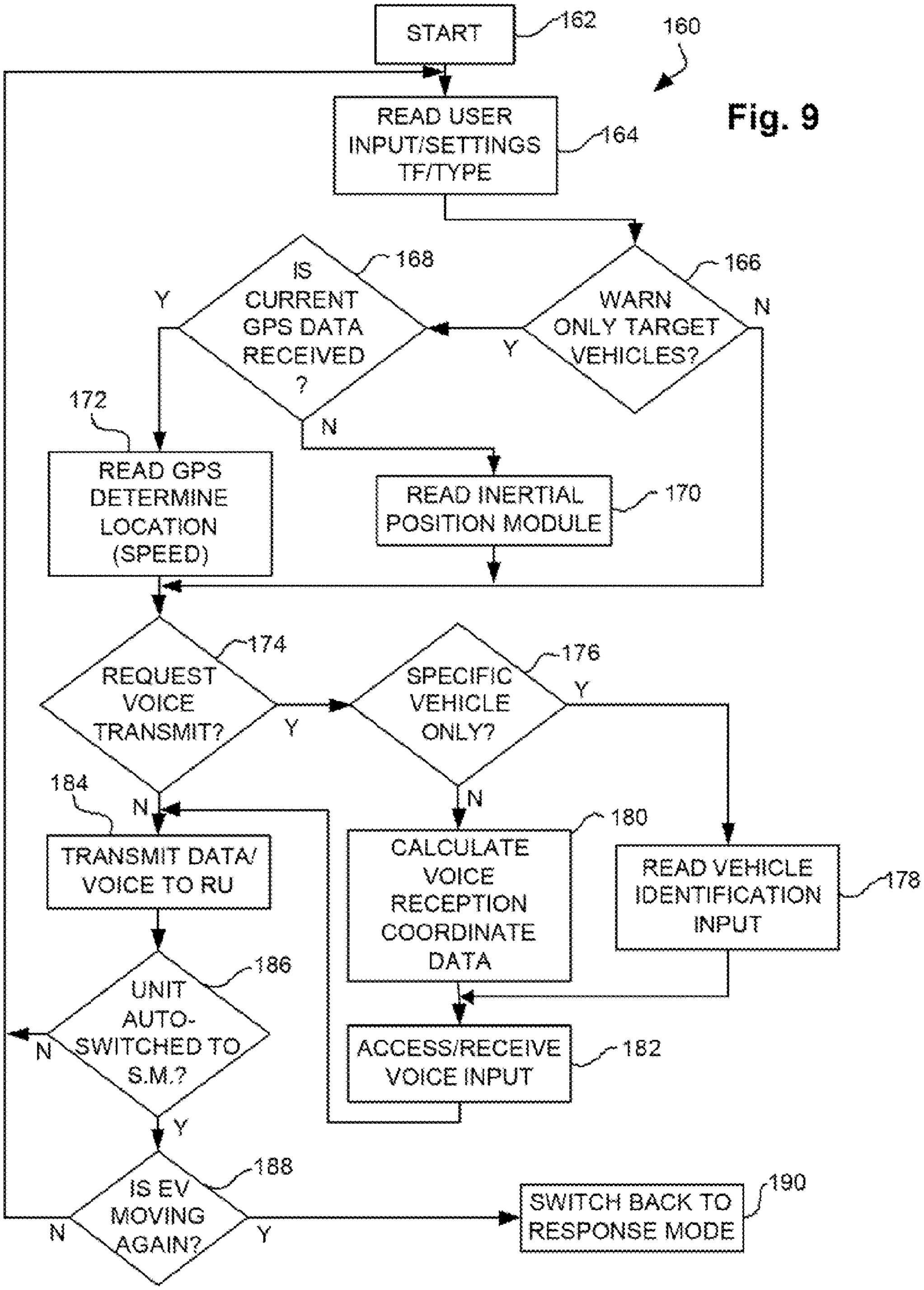
FIG. 9 is a flow chart illustrating a TU in stationary mode.

FIG. 9 depicts a process 160 executed by a TU in stationary mode. The process starts in operation 162. The TU is activated by a system operator or was automatically switched from response mode to stationary mode if EV was stationary for a predetermined interval. An integrity test performed, and a system update is performed if requested. Preferably, the GPS receiver, and the inertial positioning module if present, are always activated.

In operation 164, user input/settings are read. A target footprint, type of mission and other input are also determined. In decision 166, a determination is made as to whether warnings are to be issued to target vehicles only (or all within the reception area). If not, the process skips to operation 174. If so, the GPS reception is checked in decision 168. If the GPS data is not current and valid, an inertial positioning module is read, if present, in operation 170. The location, speed, and time are determined. A warning is output to a system operator that the TU is operating off inertial positioning data (thus advising the operator that nearby vehicles may also not be receiving good GPS data). If the GPS data is current and valid, it is used in operation 172 to determine one or more of location, speed, time, etc.

A determination is made in decision 174 as to whether voice (live or recorded) transmission is requested by a system operator. If a voice transmission is requested, a determination is made at decision 176 as to whether the voice transmission is to be directed to a specific vehicle or vehicles only. Specific vehicle identification input is read in operation 178, and in operation 182, voice input is accessed/received from a microphone, patch-through, etc. and sent to the particular RU in operation 184. If no specific vehicle is specified, coordinate data for the voice reception area is calculated in operation

180. Voice input is accessed/received from a microphone, patch-through, etc. in operation 182 and sent to the RUs in operation 184.

If voice transmission has not been requested, data is transmitted to the RU in operation 184. Note that only data, only voice, or both data and voice can be sent to the RU.

In decision 186, a determination is made as to whether the TU was automatically switched from response mode to stationary mode. If not, the process loops back to operation 164. If so, it is determined if the EV is moving again in decision 188. If the EV is not moving again, the process loops back to operation 164. If the EV is moving again, the TU automatically switches to response mode in operation 190 (See FIG. 7).

Figure 10:
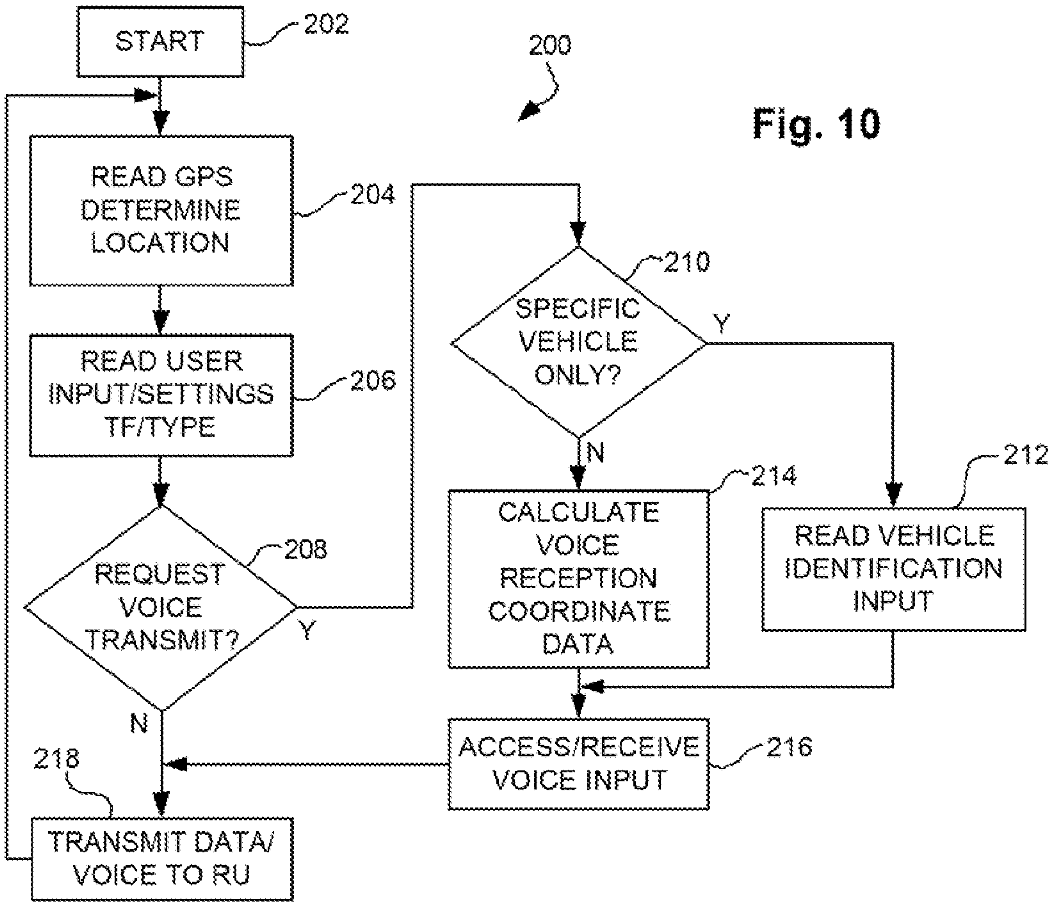
FIG. 10 is a flow diagram illustrating a TU for permanent and portable stationary units.

FIG. 10 illustrates a process 200 executed by a TU used in permanent and portable stationary units. The process starts in operation 202 upon activation by a system operator or event recognition. An integrity test can be performed, as can a system update if requested. In operation 204, GPS data is read and the location of the TU is determined using the GPS receiver and/or operator input.

In operation 206, user input/settings are read, and the target footprint and other input are determined.

A determination is made in decision 208 as to whether voice (live or recorded) transmission is requested by a system operator. If a voice transmission is requested, a determination is made at decision 210 as to whether the voice transmission is to be directed to a specific vehicle or vehicles only. Specific vehicle identification input is read in operation 212, and in operation 216, voice input is accessed/received from a microphone, patch-through, etc. and sent to the particular RU in operation 218. If no specific vehicle is specified, coordinate data for the voice reception area is calculated in operation 214. Voice input is accessed/received from a microphone, patch-through, etc. in operation 216 and sent to the RUs in operation 218.

If voice transmission has not been requested, data is transmitted to the RU in operation 218. Note that only data, only voice, or both data and voice can be sent to the RU. Again, the process ends when the TU is deactivated such as by switch off.

Public Safety Advisory Applications—Dynamic (i.e., Non-Stationary) and Stationary Events In many areas of the country—and potentially in any area of the country at some time—there is a need for an efficient method for authorities to be able to issue warnings and advisories to the general public and for the public to receive these warnings on a completely passive basis at any hour of the day. The existing hurricane and tornado siren warning systems, the Emergency Alert System and the NOAA Weather Radio utilizing SAME methodology were established and designed to meet such needs but fall far short of what is needed, and of what is possible.

This application of the present invention provides authorities with the ability to issue pertinent safety and potentially life-saving warnings and advisories to the general public in their homes, workplaces, vehicles, etc.—on a real-world, real-time basis—at any hour of the day or night. These advisories can pertain for example to weather phenomenon such as hurricane and tornado activity, potential flooding and flash-flooding situations, and virtually any other public safety issue such as threats from forest, structure, and wild fires, earthquakes, hazardous material spills, pipeline ruptures, police actions, terrorists activities, etc., where authorities need to communicate with, advise, or evacuate the public in a specific, targeted area.

Procedure and Methodology

The following describes a primary embodiment. An additional enhanced embodiment is discussed later.

Transmitting Unit (TU) for Public Safety Advisory Application

The TU can be an independent unit for use primarily at stationary events or can be operated from the base of operations of those responsible authorities, i.e., National Weather Service, Storm Prediction Center, USGS, fire, police and other public safety officials, requiring (or desiring) the ability to issue watches, warnings and advisories for hazards as mentioned above. In the case of tornado activity, for example, the target footprint (TF) and appropriate subsections can be derived from information obtained by trained spotters determining the precise location of the event in conjunction with Doppler radar and computer models and programs designed to predict the event and its path, etc. Agencies responsible for other types of hazards may, of course, employ their own methods and resources for determining which areas are to be warned. In this application, as the event (the tornado, fire, etc.) moves, if that is the case, so does the target footprint and its subsections. If the event is stationary then the TF is fixed unless, and until, it is modified as the situation dictates.

The warning library can be appropriate to the system user's area of responsibility, coupled with the system operator's ability to override the library with other (assembled) warnings, or to transmit live or recorded voice advisories to the TF as a whole, or to a specific targeted TF subsection(s), as desired. Basic system operation and transmission may mirror that of the previously defined applications. Separate and independent transmission facilities are not necessarily required for the TU in this application. Existing public agency (police, fire, weather services, etc.) transmitters may be utilized as well as commercial broadcast transmitters under agreements similar to the plan of the existing Emergency Alert System. Thus, as with other previously described applications of the system, no expensive infrastructure is required for implementation of the system.

Receiving Unit (RU) for Public Safety Advisory Application

The RU in this application can be the existing vehicle units previously described, as well as mobile handheld units for camping, hiking, boating, etc. The emphasis here, however, is on permanently installed RUs in homes and buildings. These units can be similar to the existing smoke and carbon monoxide detectors found—and required by building codes in many locales—in homes and buildings today, so that the necessary, desired communication is passively received—at any hour—without the necessity of televisions or radios being turned-on. Additionally, the system can be incorporated into home security systems, which are becoming more prevalent everyday. The information disseminated by the system is superior to that on television or radio in that it is precisely personalized to the recipient's exact geographical location.

The fixed position (e.g., wall mounted or tabletop) RU can be similar in design and function to the previously described basic RU with the exception that the unit does not necessarily have to possess a GPS (or other location system), receiver. The RU simply needs to "know" its coordinates, which can be input upon installation. Upon receiving the transmission from the TV, and a subsequent determination made that the RU location (its GPS coordinates) is within the target footprint and that it is to output a warning, a loud and sustained alert signal sounds (again, similar to a smoke or carbon monoxide detector) to gain the attention of, or wake, the buildings occupants. This can be followed by the selection, or assembling, of the warning for output, or the broadcast of the transmitted voice communication. Additional warning indicators, such as an alert strobe, a lighted display showing the alert level, a text panel whereby the warning can be displayed, or scrolled, in its entirety, and a tactile alarm for alerting or waking, can be incorporated for the hearing impaired/sleeping.

The result can be an effective and precise emergency broadcast system brought into the 21$^{st}$ Century. Authorities are able to communicate, at any hour, on a real-world and real-time basis, with those people who are within specific, targeted locations thus alerting only those who need the warning or advisory. This specific targeting coupled with the appropriateness of the warning or advisory may, as previously discussed, provide a very valuable tool for public safety officials while gaining and sustaining the public's confidence in the system. Further, with today's concern over potential terrorist activity, the utilization of such a system to institute a specific, targeted evacuation plan—without alarming the general public in widespread areas—is not unrealistic.

This application is fully consistent with the present system and methodology: A warning system whereby the precise and relative geographical location of the intended recipient, or target, is used to screen or filter the output of pertinent, situationally appropriate information.

Dynamic Event Operational Example

Figure 11:
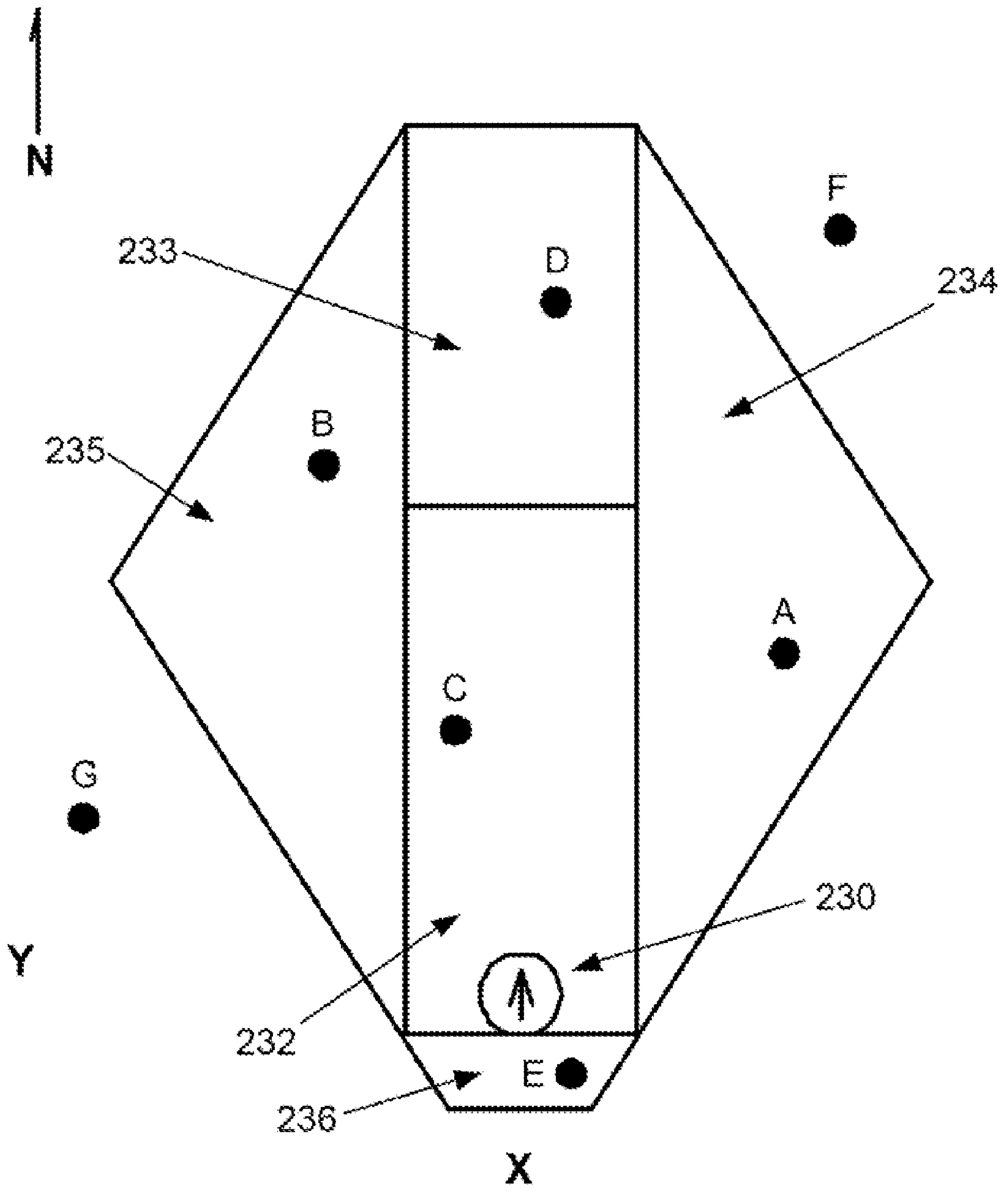
FIG. 11 is a diagram illustrating a target footprint for a non-stationary, or dynamic, event such as a weather event.

Turning to an example illustrated in FIG. 11, a weather event 230, say a tornado family, is detected by the National Weather Service. Spotter reports and radar monitoring systems determine that its center is at coordinates (X, Y) and that it is traveling north at a certain speed. Based upon all available observation information the system operator/forecaster determines that he needs to issue an immediate tornado warning to the target footprint (TF), which includes subsections, or areas, 232-236 as shown. In the alternative, the preferred TF can be automatically generated by the transmitting unit interfacing with computer models and programs designed to track and/or predict the path of weather phenomenon.

The TU then transmits a digitally-coded signal carrying numerous data topics including the data necessary for the RU to calculate the target footprint, the warning instruction criteria for the RU to output a warning (or to broadcast a live or recorded voice transmission), and instructions for the selection or assembling of the appropriate warning statement. The encoded signal is transmitted and received by all RUs (home, workplace and hand held units as well as vehicular-based units) within the entire reception area of the transmitter.

Again, as a development alternative, the TU transmission can include numerous voice warnings (warning library) to be received by the RU. These warnings are then stored in memory for subsequent selection, retrieval and output if the instructed criteria are met.

The RU, upon receiving the transmission, processes the data and determines if a warning, or voice transmission as the case might be, is to be output. For a warning to sound, the RU must be within a defined set of coordinates as represented by areas 232-236. Otherwise, regardless of the RU's reception of the transmission, no warning is output.

Warning Criteria Transmission—Processing and Results

The following warning conditions are processed by those receiving units within the RA with the results as shown:

Condition 1. If the RU location (as known, or calculated in the case of mobile and vehicular units) is within the defined set of coordinates shown as area 234, then output Warning "1". A loud and sustained alert signal sounds to gain the occupant's attention (or to wake them), followed by Warning "1".

Location A: A home located within the coordinates shown as area 234. Warning device (RU) within the home sounds Warning 1.

Warning 1 in this case may be: "A tornado warning has been issued for your area. Tornados are traveling toward your location from the south and west. Take protective measures immediately and continue to monitor this unit for further advisories." Warnings may be as descriptive in nature as desired, or as deemed feasible, by the agency issuing the advisory. For example, in this case it could include advice that if the occupants wished to evacuate to do so immediately and to do so in as easterly a direction as possible.

Condition 2. If the RU location is within the set of coordinates shown as area 235, then output Warning "2".

Location B: A camper located within area 235. Warning 2 is output on his hand-held device.

Warning 2 may be: "A tornado warning has been issued for your area. Tornados are traveling toward your location from the south and east. Take protective measures immediately and continue to monitor this unit for further advisories."

Condition 3. If the RU location is within the set of coordinates shown as area 232, then output Warning "3".

Location C: A factory located within area 232. Warning 3 is output.

Warning 3 may be: "A tornado warning has been issued for your area. Tornados are traveling directly toward your location from the south. There is not enough time for evacuation. Take shelter immediately and continue to monitor this unit for further advisories."

Condition 4. If the RU location is within the set of coordinates shown as area 233, then output Warning "4".

Location D: An office building located within area 233. Warning 4 is output.

Warning 4 may be: "A tornado warning has been issued for your area. Tornados are traveling directly toward your location from the south. Take protective measures immediately and continue to monitor this unit for further advisories."

Alternatively, the system operator can decide to communicate directly with those located within area 233 (or any area) and would, therefore, have the TU instruct the RUs within these coordinates to broadcast live (or recorded) voice transmissions. For example the system operator can advise those located within this area to evacuate immediately and what evacuation route to use.

Condition 5. If the RU location is within the set of coordinates shown as area 236, then output Warning "5".

Location E: A home located within area 236. Warning 5 is output.

Warning 5 may be: "A tornado warning has been issued for your area. Tornados are in your immediate vicinity. Take protective measures immediately and continue to monitor this unit for further advisories."

As discussed previously, all RUs within the reception area of the TU receive the TU transmissions. It is the instruction criterion within the transmission that determines whether or not the RU will output a warning or voice transmission. Therefore:

Location F: The RU receives the transmission, but is not located within any of the subsections 232-236 of the desired target footprint and, consequently, is not instructed to output a warning. As the event continues to travel north (or veer to the east if either is to be the case), the target footprint will travel with it and the RU at Location F, if it subsequently falls within the TF, will be instructed to output an appropriate warning.

Location G: This is the same situation as with Location F above. However, unless the tornado veers sharply to the west, or other disturbances are spawned, it appears unlikely that this RU will not be instructed to output a warning.

For highly simplified, yet effective, operation, all warnings can be quite non-specific in nature similar to Warning 5 above—"A tornado warning has been issued for your area. Tornados are in your immediate vicinity. Take protective measures immediately and continue to monitor this unit for further advisories". The result is that a pertinent advisory is issued to all potentially affected parties and the system operator can still have the option to communicate, via live-voice, to those needing more detailed information.

In the case of other events such as hurricanes, forest fires and major flooding, where the rate of advancement of the event is considerably slower, utilization of the system to delineate between those areas where the public is urged to take precautionary actions, areas where there is a suggested evacuation, and areas where there is a mandatory evacuation, would be most effective.

As the TF continues to travel with the event it will leave locations behind that previously received a warning. When the RU determines that it no longer falls within the TF, (or it no longer receives the TU transmissions) it outputs a Cancellation or All Clear notification. This can also be case when the event dies out and/or the TU is deactivated.

Vehicle-based RU operation, though not described here, is preferably essentially the same as in the previously discussed applications.

Stationary Event Operational Example

Figure 12:
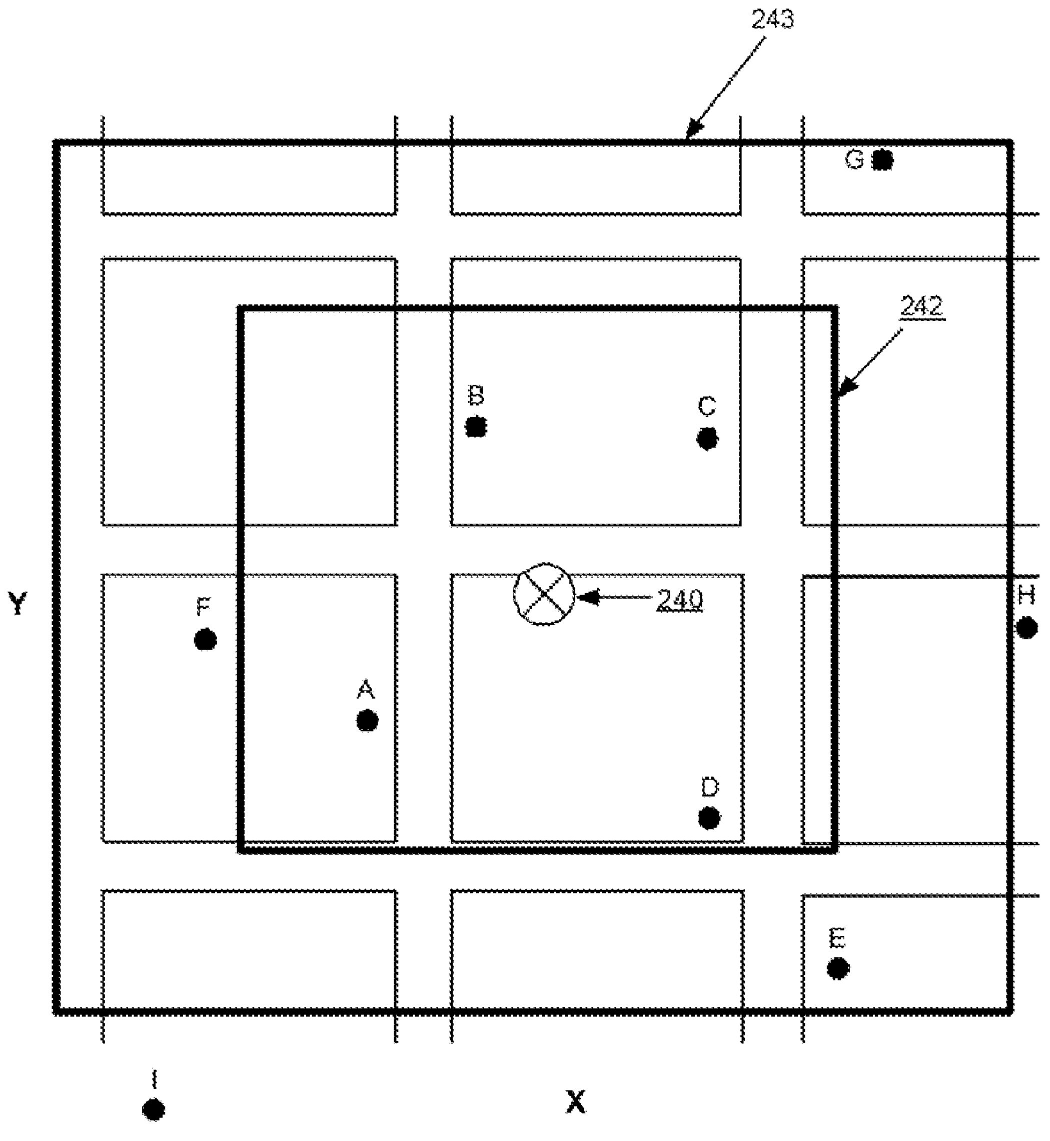
FIG. 12 is a diagram illustrating a target footprint for a stationary event.

Turning now to the example illustrated in FIG. 12, a stationary event, say a hostage situation or hazardous material spill, 240 is in progress at the location shown. It is determined that the coordinates of this location are (X, Y). After full assessment of the situation by authorities it is determined that an advisory target footprint (TF) including subsections, or areas, 242-243 shall be implemented for the receipt of advisories that the controlling agency wishes to issue.

In this example the police or public safety officials have opted to implement a mandatory evacuation of occupants of all buildings (and vehicles) within a distance of approximately 1 block of the event, shown as area 242, and to warn and advise occupants of buildings within 1½ blocks, shown as area 243, to remain inside their building until further notice. The situation is such that the officials have decided to issue live-voice advisories. In the alternative the voice warnings can be immediately recorded on-site.

The transmitting unit (TU) then performs its tasks of calculating the coordinate data for defining areas 242 and 243, generating the warning instruction criteria, etc., and transmits this data as well as the live or recorded voice, for reception by all receiving units within the receiving area of the transmitter.

The RU receives the transmission and completes its calculations. Based upon the geographic location of the individual RU a certain warning or advisory (or no warning as the case might be), will be output for the benefit of the occupants of the building or vehicle housing the RU. As in all applications of the present system, for a warning to be output the RU must be within the TF—in this case within the coordinates of areas 242 or 243.

Warning Criteria—Processing and Results:

Condition 1. If the RU location (as known, or calculated in the case of mobile and vehicular units) is within the set of coordinates shown as area 242, then output voice Warning "1". Again, a loud and sustained alert signal sounds to gain the occupant's attention followed by transmitted Warning "1".

Locations A, B, C, and D: Buildings located within the coordinates shown as area 242. Warning devices (RUs) within these buildings output Warning 1.

Warning 1 in this case might be: "This is an emergency alert. Public safety officials are imposing a mandatory evacuation of your location. Please exit your building immediately and proceed in the direction away from official activity or as directed by personnel outside your building". As with the Dynamic Event, vehicle-based RUs receive the warnings as well. If the RU is a vehicle-based unit then a different, appropriate warning can be selected.

Condition 2. If the RU location is within the set of coordinates shown as area 243, then output voice Warning "2".

Locations E, F, and G: Buildings within area 243. Warning 2 is output.

Warning 2 might be: "This is an emergency alert. Please remain inside your building and continue to monitor this unit for further advisories."

RUs outside the TF (but within the reception area of the TU) receive the transmission but do not receive the instruction to output a warning.

Locations H and I: Buildings outside of TF (area 242 and 243). No warning is output.

The option to exclude a specific area, or location, from the target footprint may also be available. This can be useful in a hostage or barricade situation where authorities do not want individuals in that specific location to be able to monitor the advisories. Authorities may also choose to unilaterally communicate with only those persons at a specific location if desired by selecting that location to be a specific subset of the TF.

Enhanced Embodiment

Handheld units for camping, hiking, boating, etc. can be equipped with a transceiver and a Mayday option whereby the user can notify authorities in the event of an emergency. This notification can be by voice or via an auto-mode where a selection of type of emergency may be made through a user interface and continuously transmitted at a predetermined interval on a designated emergency frequency. The transmission can include the voice or type of emergency information, and automatically attach the unit/user identification number, and the GPS coordinates of the unit's location at time of transmission. This information would be immensely valuable to search and rescue personnel and/or other authorities.

Figure 13:
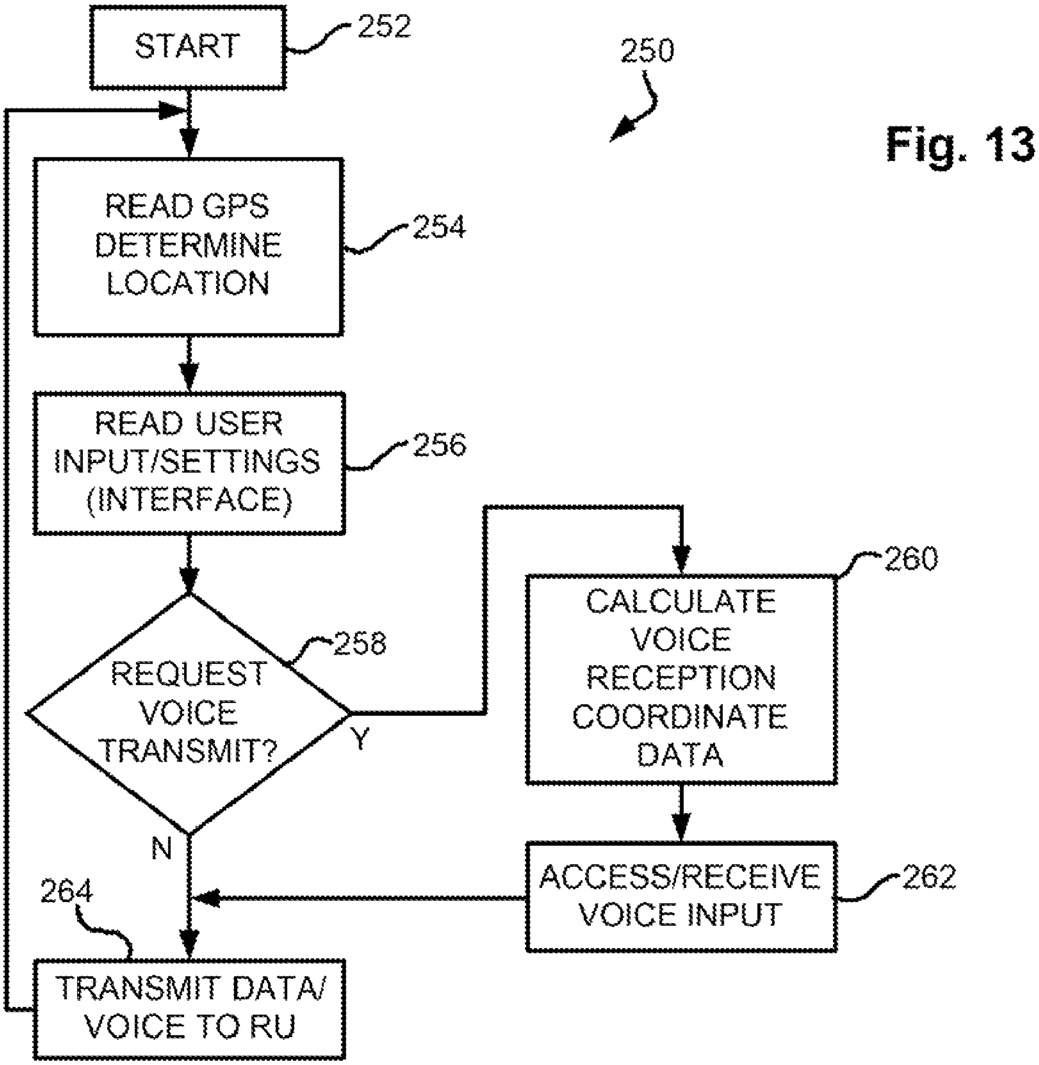
FIG. 13 is a flow diagram of a process performed by a TU used for public safety advisories.

FIG. 13 is a flow diagram of a process 250 performed by a TU used for public safety advisories. The process starts in operation 252 upon activation by a system operator. An integrity test can be performed, as can a system update if requested. In operation 254, GPS data is read and the location of the TU is determined. This step is appropriate primarily for on-site units at stationary events. In operation 256, user input/settings are read. The target footprint and other input are determined. The TU may also interface with a computer model or program predicting an event and/or anticipated path, if present. A determination is made in decision 258 as to whether a voice, (live or recorded) transmission is requested by a system operator. If so, coordinate data for the voice reception area is calculated in operation 260 and voice input is accessed/received from a microphone, patch-through, etc. in operation 262. In operation 264, data (and voice if requested) is transmitted to a RU. The process loops back to operation 254. The process ends when the TU is deactivated by switch off.

Figure 14:
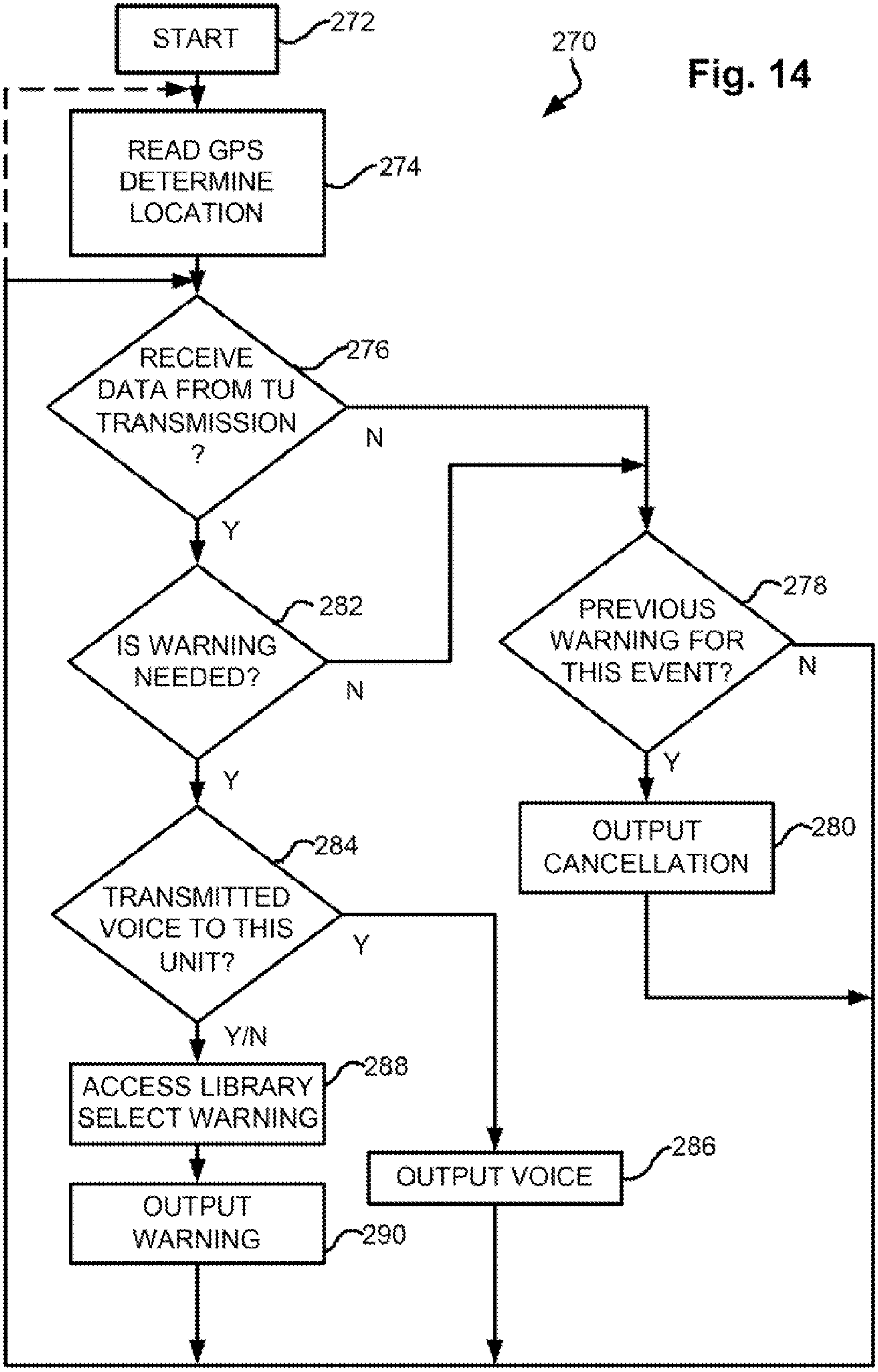
FIG. 14 is a flow chart of a process performed by a RU used for public safety advisories.

FIG. 14 depicts a process 270 performed by a RU used for public safety advisories. In operation 272, the RU is activated by power on (mobile units) or at installation. A system update can be performed by a service center or other means if requested. In operation 274, GPS data is read and the location of the RU determined. Note that permanently installed units do not necessarily require a GPS receiver. Location coordinates can be input at installation. Mobile units for camping, boating, etc., do require a GPS receiver.

In decision 276, it is determined whether data transmission from a TU has been received. If so, the process proceeds to decision 282. If not, a determination is made in decision 278 as to whether a previous warning has been output for this event. If no previous warning has been output for this event, the process returns to decision 276. Note that for mobile units, the process loops back to operation 274 so that the location can be recalculated. If a previous warning has been output for this event, a cancellation notice is output in operation 280, and the process loops back to decision 276 (or 274 for mobile unit).

If a transmission is received from a TU at decision 276, the data is saved and/or processed. A determination is made in decision 282 as to whether the instructions call for a warning, or transmitted voice, to be output. If not, the process proceeds to operation 278, discussed above. If so, it is determined whether this unit is to receive and output transmitted voice. See decision 284. If voice is to be output, the audio system, if present and activated, is muted, volume reduced, or overridden and the transmitted voice is received and output in operation 286. Voice reception and output are maintained until the link is terminated by the sender such as by microphone switch off; then the process loops back to decision 276 (or 274 for mobile unit).

A warning can also be selected and output in operations 288-290. In operation 288, a warning library and/or lookup table is accessed and a warning is selected and/or assembled. In operation 290, the audio system is muted/overridden if activated, and the warning is output. Note that operations 286-290 are not exclusive of each other and can be performed together.

The RU is deactivated by switch off. Preferably, there is no deactivation for permanently installed units.

Aircraft Applications

Protected Area (No-Fly Zone) Advisory With or Without Automatic Flight Intervention Capabilities In addition or as an alternative, the concepts of the present invention are useful in warning a surrounding/encroaching vehicle, such as an airplane, automobile, truck or the like, and others, of the vehicle's approach toward a given venue, which may be a hazard site, restricted area, landmark, building or other area to be protected. The system may even take over control of the vehicle or redirect the vehicle away from the site. This can be particularly useful in enforcing established and desired no-fly zones, thus preventing the use of an airplane, or the like as a "missile" against a site, such as a city, military base, nuclear power plant, refinery, the U.S. Capitol, Hoover Dam, etc.

The previously described elements and concepts of the present invention can be applied to provide such a protected zone. For example, commercial airliners and most corporate aircraft have sophisticated automatic flight systems and can be equipped with a receiving unit (RU) of the nature described above. Cities and governmental agencies have the resources to establish broadcast facilities like the transmitting units (TU's) described above at fixed locations.

Procedure and Methodology

The following describes a primary embodiment. Additional embodiments of the system are discussed later.

In a first example, assume a city, facility, etc., has established fixed, redundant transmitters (TU's) to broadcast a signal to all planes (RU's) or other vehicles within a desired appropriate reception area (e.g., 20, 30, 40 miles, etc.) instructing those RU's to determine their three dimensional geographic location (including altitude), speed and projected flight path. The transmission preferably includes additional logic instructions such as:

If your location is within the target footprint (the defined range of three-dimensional coordinates surrounding and above the site, and can be further divided into appropriate subsections), and your projected flight path intersects the prohibited or restricted zone(s), then a specific warning, demanding a required diversionary action, is issued when the time to intersect is appropriate.

The warning can include a specific number of seconds to allow compliance with any instruction, or to override the system of the aircraft or other vehicle via a code as discussed below.

If the required diversionary action (change of altitude and/or heading, etc.), or system override is not taken within the allotted time, the RU will, via an automatic flight system interface, divert at least partial control of the aircraft to the auto-flight system which intervenes and initiates the appropriate action. This control intervention can be a number of things including changing the aircraft heading, not descending below a certain altitude, climbing to a certain altitude, etc., and can be implemented in accordance with any preferences and priorities adopted and programmed for the subject protected area.

At this point the system cannot be disengaged by cockpit personnel. Control of the plane would be returned to the pilot only when the threat had passed or when ground control had determined that the plane is in friendly hands. The RU can be programmed to perform a number of other desired functions such as notifying ground control and other authorities of the aircraft's invasion of a no-fly area, its non-compliance with instructions, etc., so that the appropriate law enforcement and/or military response could be initiated.

The protected area and the aircraft can thus be thought of as "like poles of a magnet" whereby the protected area (e.g., through radio transmitted instructions and auto-flight system intervention) actually repels an aircraft out of the restricted airspace. An aircraft simply cannot enter the restricted area without the system automatically forcing it back out—again and again if necessary. The methodology is completely automatic and instantaneous—and does not rely on any human interaction which inherently introduces the potential for human error and/or a critical delay in reaction time.

Further, the same concepts of the present invention can be utilized to provide protection for areas near sensitive airports and the like. For instance, for take-offs and landings in dense urban areas where airports, such as Reagan National Airport, are in close proximity to a protected area, the aircraft RU would be instructed to employ specific take-off or approach parameters defined for that airport. So long as the plane stays within the proper ascending or descending parameters (e.g., a cone-shaped set of three-dimensional coordinates) no control intervention would occur. Any deviation would initiate immediate auto-flight system intervention, which would maintain a proper take-off pattern (e.g., not descend below the current altitude at the time of transgression), or abort a landing, so that tragedy on the ground can be prevented.

These concepts are also useful with regard to major professional, college and other sporting events, and any other large gathering where it is desired to establish and enforce a temporary no-fly zone. The concepts of the present invention can be useful in portable transmitting units deployed for events such as these, and in other circumstances as well.

Protected Area (No-Fly Zone) Advisory/Intervention Operational Example

The following operational example is configured to no-fly zones recently established by the Nuclear Regulatory Commission around the nation's 100+ nuclear reactors. There are numerous ways to apply the concepts and capabilities of the present system to provide the protection described to these facilities and other venues such as dams, sporting events, refineries, sensitive areas of cities; and the like. Should the present system be adopted, no-fly zones of more appropriate dimensions, or even a tiered zone system, could be established around these areas.

Figure 15:
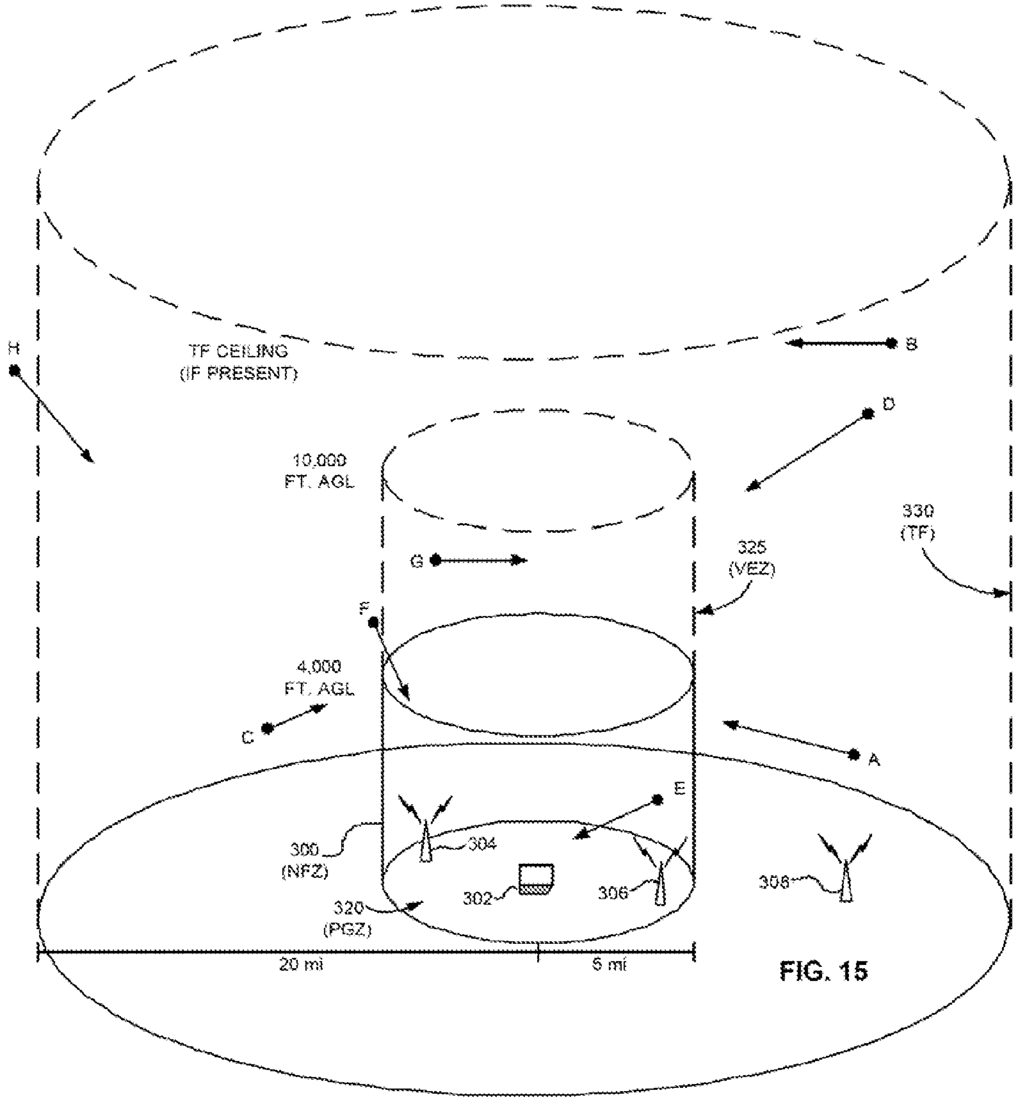
FIG. 15 is an oblique view of various air zones surrounding a protected area.
Figure 16:
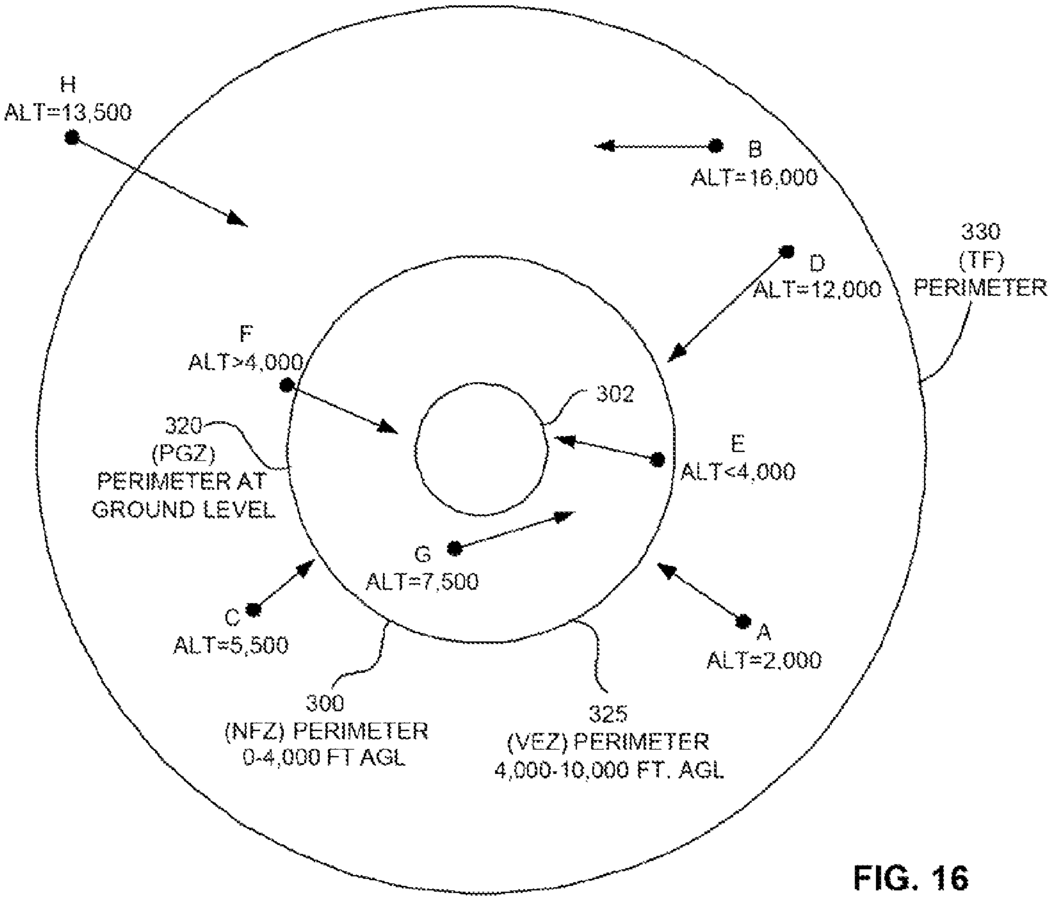
FIG. 16 is top-down view of various air zones surrounding a protected area.

Turning to the example illustrated in FIG. 15 (oblique view) and FIG. 16 (vertical view), a no-fly zone (NFZ) with a radius of 5 miles and a ceiling of 4,000 feet above ground level (AGL), being a defined set of GPS coordinates shown as the cylinder-shaped area 300, has been established around the nuclear reactor 302. Various, and redundant (as a safeguard against malfunction or sabotage) transmitting units (TU) 304, 306 and 308, each with a transmission reception area (RA) radius of approximately 30 miles, are installed on the reactor's grounds, or elsewhere. Three additional areas or zones, all being a defined set of GPS coordinates, are established for this facility. They are:

Protected ground zone (PGZ). Shown as area 320, this zone also has a radius of 5 miles from the facility, and is a two-dimensional area at ground level (the base of the NFZ 300 and therefore a sub-set of the NFZ coordinates).

Vertical extension zone (VEZ). Shown as area 325, it is a cylinder-shaped vertical extension of the NFZ cylinder with a 5-mile radius, a base of 4,000 feet AGL (the ceiling of the NFZ) and a ceiling of 10,000 feet AGL.

Target footprint, or area, (TF). Shown as area 330, the TF is a cylinder-shaped area with a radius of 20 miles from the facility (excluding those areas shown as 300 and 325), and an appropriate ceiling, or no ceiling.

The transmitting unit (TU) 304, 306 and 308 constantly transmits data for reception and use by the receiving unit (RU) which can include: the prohibited (or restricted) NFZ identification number; the coordinates of the protected subject; data necessary for the RU to calculate the NFZ, PGZ, VEZ and the TF; the warning library; the RU advisory transmission library; the cockpit advisory library; any control intervention scheme preferences and priorities for this location; the processing instructions for the receiving unit and the single-use system override code for use by air traffic control (ATC) authorities, or others. Additionally, RU reprogramming information for updates and/or unit functionality can be transmitted to be applied if needed. As an alternative, in lieu of the TU transmitting the libraries referenced above, the RU can possess these stored libraries and a vocabulary/look-up table and, via the transmitted processing instructions, can determine the warning, transmission and advisory to be output.

The RU, present in each Aircraft A through H, having been activated at engine start or system power-up, has continually monitored its position, heading, and air speed by way of the positioning and navigation sub-system which integrates inertial and GPS measurements for highly accurate positioning. Alternatively, the RU can interface with the aircraft's existing navigation system which can provide this information. Upon receiving a transmission from a TU (the aircraft having flown into the TU reception area) the RU stores the relevant transmitted data and libraries, and performs the calculations necessary to determine if the aircraft's projected flight path will intersect the NFZ, PGZ or VEZ, and if such is the case, the point and time of intersect, and the course changes (diversionary demands) necessary to avoid the NFZ or the VEZ. Further, if the aircraft is equipped with auto-flight control capabilities the RU, based upon this information (as it is continuously updated), calculates the auto-flight control intervention scheme (CIS) to be implemented via an auto-flight system interface when, and if, needed. Lastly, the RU will transmit to authorities (i.e., ATC, USAF) various status advisories including the projected heading and velocity of the aircraft, the violation of airspace should this occur, as well as the instructed course change given to the violating aircraft so that, among other things, ATC can vector other aircraft in nearby airspace, if that is the case, to maintain proper aircraft separation. Additional RU transmissions can be issued as explained later.

Warning/Intervention Criteria—Processing and Results

The factors determining whether a warning, and control intervention, will be implemented are:

1. Location.
   a. For warning: Is aircraft within the TF?
   b. For intervention: Is the aircraft within the NFZ or the VEZ?
2. Projected flight path.
   a. For warning: Does it intersect the NFZ or VEZ?
   b. For intervention: Does it intersect the PGZ?
3. Time.
   a. For warning: How long to intersection with the NFZ or VEZ?
   b. For intervention: How long to intersection with the PGZ?

Additional factors determining the warning's diversionary demands and the scheme of control intervention are:

1. Altitude. Warning only: Is aircraft above or below the NFZ ceiling?
2. Point of intersection.
   a. For warning: Right or left of the NFZ or VEZ centerline from aircraft's perspective?
   b. For intervention: Right or left of the PGZ centerline from aircraft's perspective?

Accordingly, the TU transmits the previously referenced data including the following instructions to be processed by the RU with the results as shown:

Condition 1—Warning. If the aircraft's (the RU) location is within the set of coordinates 330 (TF); and the altitude is less than 4,000 feet above ground level (AGL), thus below the NFZ ceiling; and the projected flight path intersects with the NFZ right-of-centerline; and the time of intersection with the NFZ is less than 90 seconds then retrieve and transmit pending violation advisory and retrieve and output Warning "1".

In this example (and dependent upon the angle of intersection with the NFZ), an aircraft traveling at 180 miles per hour would receive the first warning when it is approximately 4.5 miles from the NFZ (9.5 miles from the reactor). Traveling at 600 mph (approximate airliner Mach cruise speed) an aircraft would receive the first warning immediately upon, or shortly after, entering the target footprint 15 miles from the NFZ (20 miles from the reactor). In either case the pilot would have approximately 90 seconds to comply with the diversionary demands.

Aircraft A: Its position is within the coordinates shown as 330 (TF) at an altitude of 2,000 feet AGL. Aircraft is on a course which intersects the NFZ, right-of-centerline (from its perspective). Its distance to the NFZ and speed show that it will intersect the NFZ within 90 seconds. Pending violation advisory is transmitted by RU and Warning 1 is output in aircraft.

Transmitted pending violation advisory in this case can include: the aircraft's identification and position, the time and point of aircraft intersection with the NFZ (all data calculated and input by the RU), the prohibited airspace identification, whether the aircraft is auto-flight control capable, the directed change of course for use by FAA and ATC authorities as well as military, if applicable. Additionally, the encoded system override code would be transmitted to authorities on the ground to be forwarded to the cockpit (or to the company dispatcher who could relay it to the cockpit via aeronautical radio) in case of emergency or malfunction.

Warning 1 could be: "Impending airspace violation. Turn right heading (X) (a heading which will comfortably skirt the NFZ) and climb above 4,000 feet AGL." If the aircraft is equipped with auto-flight capabilities it would output an addendum: "If not in compliance control intervention will be initiated in (Y) seconds" (where X and Y are calculated and input into the warning template by the RU processor).

The diversionary demand instruction can include both heading and altitude course changes to ensure no intersection will occur, or it could be an either/or instruction depending upon which measure is more immediately attainable to avoid intersection with the NFZ.

Aircraft B: Its position is within the coordinates shown as 330 (TF) at an altitude of 16,000 feet AGL. Aircraft is not on a course which intersects the NFZ. No warning is output.

Condition 2—Warning. If the aircraft's (the RU) location is within the set of coordinates 330 (TF); and the altitude is more than 4,000 feet AGL (thus above the NFZ ceiling); and the projected flight path intersects with the NFZ left-of-centerline; and the time of intersection with the NFZ is less than 90 seconds; then retrieve and transmit pending violation advisory and retrieve and output Warning "2".

Aircraft C: Its position is within the coordinates shown as 330 (TF) at an altitude of 5,500 feet AGL. Aircraft is on a course which intersects the NFZ, left-of-centerline within 90 seconds. Pending violation advisory is transmitted by RU and Warning 2 is output in aircraft.

Warning 2 could be: "Impending airspace violation. Turn left heading (X). Maintain altitude above 4,000 feet AGL." If auto-flight equipped it would output addendum: "If not in compliance control intervention will be initiated in (Y) seconds."

Condition 3—Warning. If the aircraft's (the RU) location is within the set of coordinates 330 (TF); and the altitude is more than 10,000 feet AGL (above the VEZ ceiling); and the projected flight path intersects with the VEZ left-of-center; and the time of intersection with the VEZ is less than 90 seconds; then retrieve and retrieve and output Warning "3".

Aircraft D: Its position is within the coordinates shown as 330 (TF) at an altitude of 12,000 feet AGL. Aircraft is on a course which intersects the VEZ, left-of-centerline. Its location and speed show that it will intersect VEZ within 90 seconds. Warning 3 is output in aircraft.

Warning 3 could be: "Impending intersection above protected (or restricted) airspace. Turn left heading (X) (a heading which will skirt the VEZ) or maintain altitude above 10,000 feet AGL." Again, if the aircraft is equipped with auto-flight capabilities it would output an addendum: "If not in compliance vertical control intervention will be initiated in (Y) seconds."

Condition 4—Intervention. If the RU location is within the set of coordinates shown as 300 (NFZ) then implement control intervention immediately, retrieve and transmit violation advisory, and retrieve and output cockpit Intervention Advisory "1".

Aircraft E: It has just entered the coordinates shown as 90 (NFZ). The aircraft (having been on a course which intersects the NFZ for some time) has previously been instructed to output a warning, adjust course and transmit a pending violation advisory. Course adjustment was either not made, or not made soon enough to avoid intersection with the NFZ. Control intervention is implemented, violation advisory is transmitted, and Intervention Advisory 1 is output in the cockpit.

Auto-flight control intervention: Computed by RU based upon point of intersection with PGZ, vertical descent angle, any CIS preferences and priorities which may be in place for this protected area (e.g., not directing the aircraft over a populated area), etc. In this example, Aircraft E is diving towards the PGZ (and the reactor) just right of its centerline and there are no preferences and priorities for control intervention in place for this location. Intervention could take the form of leveling the aircraft and then climbing while turning right to an appropriate heading that will take the aircraft out of the NFZ.

Transmitted violation advisory can include all pertinent data such as the aircraft's identification and position, the time and point of aircraft intersection with the NFZ, the prohibited airspace identification, the auto-flight intervention, for use by FAA and ATC authorities as well as military, if applicable, and the encoded system override code which can be forwarded to the cockpit in case of emergency or malfunction.

Cockpit Intervention Advisory 1 can be: "Airspace violation. Control invention has been initiated to climb and turn right heading (Y). Control will be returned to you when aircraft has cleared the protected airspace or override code is entered."

Condition 5—Intervention. If the RU location is within the set of coordinates shown as 330 (TF), and the projected flight path intersects the PGZ in less than 30 seconds, then implement control intervention immediately, retrieve and transmit violation advisory, and retrieve and output cockpit Intervention Advisory "2".

This instruction provides protection from those aircraft whose speed and angle of intersection with the PGZ (possibly the facility itself) are such that if the system waited until the aircraft violated the NFZ there may not be adequate time for the auto-flight system to achieve proper flight control of the aircraft to prevent the facility being struck. It ensures that intervention would occur at an approximate, prescribed time interval (in this case 30 seconds) prior to the aircraft intersecting the PGZ. This would primarily affect those aircraft that would dive into the NFZ at a high rate of speed.

Aircraft F: Its position is within the coordinates shown as 330 (TF) at an altitude, speed and descent angle intersecting the PGZ so that there may not be ample time for proper control intervention if it is not implemented until the aircraft breeches the NFZ. The RU calculations show that, while it is still above the NFZ, the computed time to intersection with the PGZ is 30 seconds, or less. As described for Aircraft E, control intervention is implemented, violation advisory is transmitted, and Intervention Advisory 2 is output in cockpit.

Condition 6—Intervention. If the RU location is within the set of coordinates shown as 325 (VEZ) (regardless of altitude or flight path) implement vertical control intervention and retrieve and output cockpit Intervention Advisory "3".

This instruction applies to all aircraft traversing above the NFZ cylinder, but at an altitude less than 10,000 feet AGL. It provides protection from those aircraft that would partially traverse the 5 mile radius of the NFZ above its 4,000 ceiling (up to 10,000 feet) then dive down the NFZ in an effort to strike the protected facility.

Aircraft G: Its position is within the coordinates shown as 325 (VEZ) at an altitude of 7,500 feet AGL. It was previously issued a warning that it was on a course to intersect this airspace and that vertical control intervention would be implemented when that occurred. It has now entered the VEZ and vertical control intervention is implemented and cockpit Intervention Advisory 3 is output.

Vertical auto-flight control intervention: In this example the intervention might be to prevent the aircraft from descending below the altitude at which it entered the VEZ, (or climb back to that altitude) or limit its descent to 1,000 feet below that altitude but in no event below 4,000 feet until it had flown out of VEZ.

Cockpit Intervention Advisory 3 can be: "Traversing above protected airspace. Vertical control intervention implemented to maintain your altitude above (X) feet AGL. Vertical control will be returned to you when aircraft has cleared the protected airspace ceiling or override code is entered."

Aircraft H: Its position is within the 30 mile reception area (RA) of the TU transmissions. Its current course will soon intersect the TF 330 and, unless altered, its projected course will intersect the NFZ. The aircraft is, however, outside the 20 mile radius TF and therefore, regardless of its speed no warning is output at least until the aircraft enters the TF.

Compliance or Non-compliance and Cockpit Advisories

Once the RU has been instructed to transmit a pending violation to ground authorities, and a warning has been output in the cockpit, the RU will constantly monitor its position to determine the aircraft's compliance or non-compliance with the diversionary demands. If the aircraft has altered its course and/or altitude, and thus is in the process of diverting from a potential intersection with the NFZ, then the RU will transmit a Compliance in Progress advisory to ground authorities. If however, after the appropriate time interval, the aircraft is not complying with the diversionary demands then the pending violation advisory will again be transmitted and the cockpit warning will again be output, this time in a more urgent tone similar to the existing Traffic Collision and Avoidance System (TCAS) in place in cockpits today. Moreover, the language of the cockpit warning could also change as intersection with the NFZ becomes more imminent to indicate the need for timely compliance. This process will be continued until the aircraft is no longer on a flight path to intersect the NFZ 300 or until control intervention is implemented if the aircraft is so equipped. Once the aircraft no longer threatens the NFZ 300 or has cleared the NFZ, as the case may be, a Compliance is Complete advisory will be transmitted and a similar cockpit advisory will be output.

System Override. The methodology of overriding the system with an encoded single-use override code transmitted from the TU to the RU, then to ATC, the company dispatcher, or other authorities for ultimate forwarding to the cockpit if warranted, is but one way to provide for system override. There are certainly other suitable procedures to attain override capabilities while maintaining the protection the system can provide.

Airspace Violation Advisory

The present system can also function as an "advisory only" system issuing the appropriate warning of a violation of other air space and demanding the pilot's compliance from general aviation aircraft and others not equipped with auto-flight systems. This application of the system would be beneficial for the situations described above as well as for when a pilot encroaches into commercial airspace. One of the most challenging aspects of flying for the general aviation pilot is navigating through the complex airspace system without violating airspace. Permanently installed TUs on the ground, or TUs installed directly on commercial aircraft for transmission in flight, could warn these pilots that they are encroaching into commercial airspace so that they could take appropriate action.

As in the previous discussion the receiving units in such aircraft would automatically transmit a notification to authorities that the aircraft had violated a no-fly zone and, subsequently whether or not the aircraft was in the process of complying with the diversionary demand. This would enable authorities, including the military, to also take appropriate action regarding these aircraft if the situation warranted.

Transmitting Unit (TU) for Aircraft Applications

Figure 17:
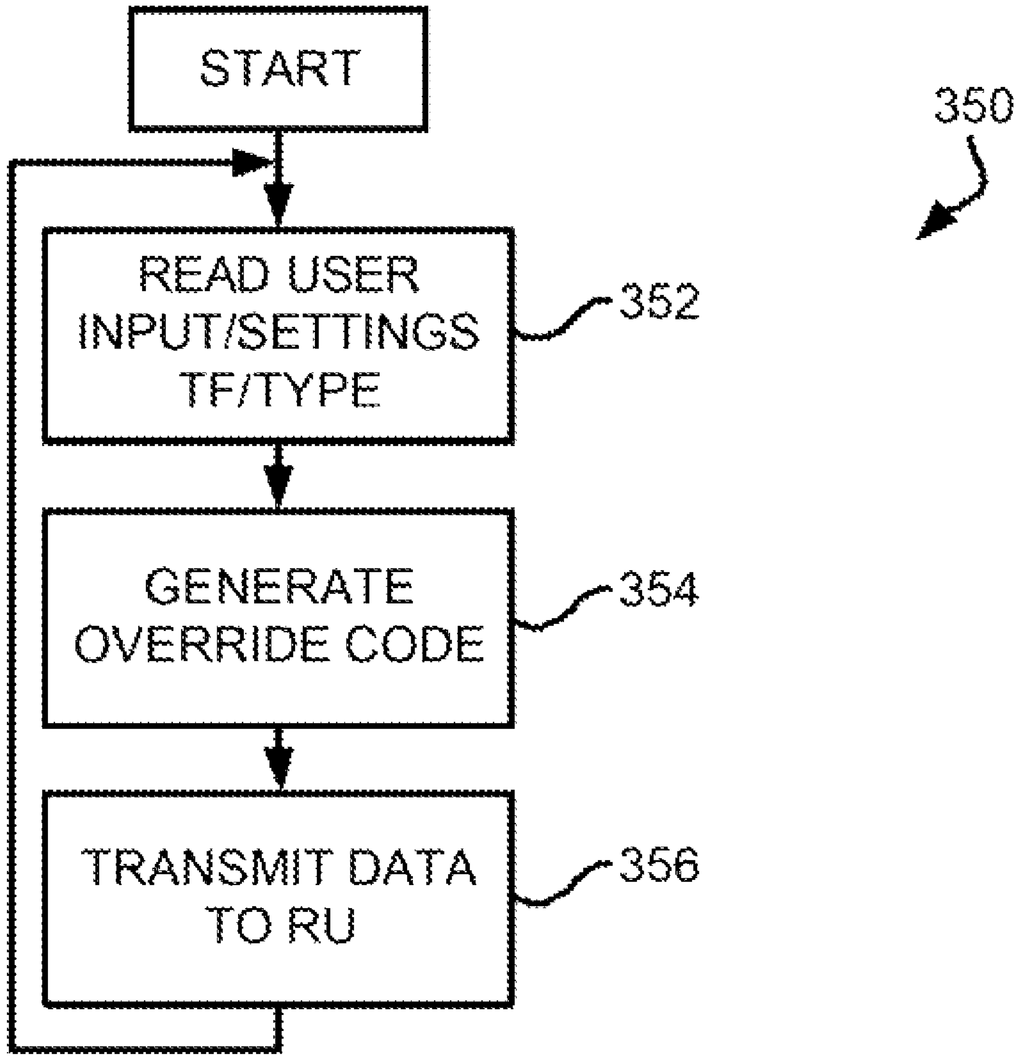
FIG. 17 is a flow diagram of a process performed by a TU for aircraft applications.

FIG. 17 depicts an illustrative process 350 executed by a TU for aircraft applications. The process shown applies to both permanent and portable units. The TU reads user input and settings, as well as the target footprint and type in operation 352.

In operation 354, a single-use override code is generated and stored. Data to be included in transmission is accessed in operation 356. Such data can include the following:

A Prohibited airspace identification number

B Data necessary for the RU to calculate the no-fly zone (NFZ) the protected ground zone (PGZ), the vertical extension zone (VEZ), and the target footprint/area (TF)

C Libraries to include warnings, transmission advisories and cockpit advisories templates D Any diversionary demands and/or control intervention scheme (CIS) preferences and priorities E Processing instructions for the receiving unit (RU)

F Encoded single-use override code (for use by ATC, or other authorities)

In operation 356, some or all of the data items A-F are transmitted to the RU, preferably via an encoded signal. The process loops back to operation 352 until terminated or the TU is deactivated by switch off.

Receiving Unit (RU) for Aircraft Applications

Figure 18:
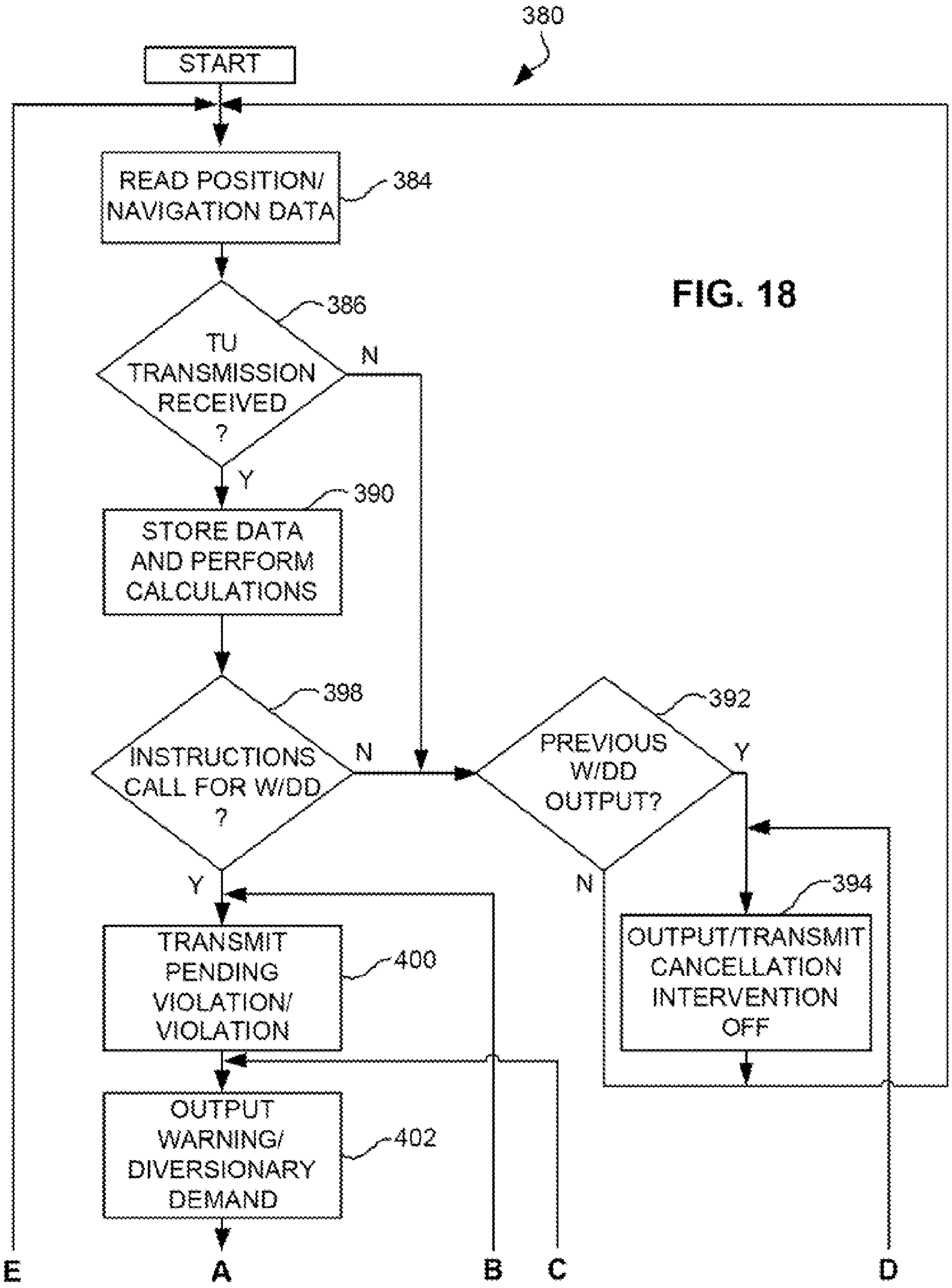
FIG. 18 is a flow chart of a process performed by a RU for aircraft applications.

FIG. 18 graphically illustrates a process 380 performed by a RU for aircraft applications, according to one embodiment. Note that the RU can function with or without automatic flight intervention capabilities. The positioning/navigation subsystem is preferably always activated. Data is read in operation 384 for determining aircraft position and air speed. At decision 386, if a TU transmission is received (aircraft has entered, or is still within, the Reception Area), the transmitted data items A-F are stored, the data is processed and calculations are performed in operation 390. These calculations can include:

Projected flight path

Point and time of intersection with relevant zone(s)

Preferred course and altitude changes necessary to avoid relevant zone(s)

Control intervention scheme (if auto-flight control capable)

The process continues on to operation 398.

If, at decision 386, a TU transmission has not been received, a determination is made at decision 392 as to whether a previous warning/diversionary demand (W/DD) has been output for this event. If so, a cancellation is retrieved, output to cockpit and transmitted in operation 394. If a previous W/DD has not been output, the process returns to operation 384. Alternatively, the system may turn off or go into standby mode until a TU transmission is detected.

In decision 398, a determination is made as to whether the instructions call for a W/DD. If not, the process proceeds to 392 (discussed above). If so, in operation 400, a pending violation, or violation, template is retrieved, variables are input, and the advisory is transmitted. Similarly, in operation 402, a warning template is retrieved, variables are input, and the W/DD is output. In operation 404, after a suitable or predetermined interval, position data is again read and compared with the previous position data determined in operation 384. In decision 406, the RU determines whether the aircraft is in prohibited airspace or other control intervention zone (e.g., the NFZ or the VEZ), or if its flight path will intersect the PGZ in 30 seconds, or less. If so, the process proceeds to operation 420. If not, a determination is made at decision 408 as to whether the aircraft was previously in the control intervention zone, and if not, the process proceeds to decision 412.

If the aircraft was previously in the control intervention zone, an out-of-prohibited-area template is retrieved, variables are input, and the out-of-prohibited-area/out-of-controlled-zone information is transmitted in operation 410. A cockpit advisory can also be retrieved and output. The process then loops back to operation 394.

In decision 412, calculations are performed to determine whether compliance is in progress. If compliance is not in progress (as determined by the system), the process loops back to operation 400. If compliance is in progress, in operation 414, a compliance-in-progress template is retrieved, variables are input, and the compliance-in-progress information is transmitted. A cockpit advisory can also be retrieved and output.

In decision 416, a determination is made as to whether the flight path is still intersecting prohibited airspace or a control intervention zone. If so, the process loops back to operation 402. If not, in operation 418, a compliance-is-complete template is retrieved, variables are input, and the compliance-is-complete information is transmitted. A cockpit advisory can also be transmitted. The process loops to operation 394.

If the aircraft is not equipped with auto-flight capabilities, as determined in decision 420, a violation template is retrieved in operation 422, variables are input (including that aircraft is not equipped with auto-flight capabilities), and the violation is transmitted. A cockpit advisory can be retrieved and output. The process loops back to operation 384.

If the aircraft is equipped with auto-flight capabilities, as determined in decision 420, a determination is made in decision 424 as to whether the override code has been entered. If the code has been entered the process proceeds to operation 432, which transmits/outputs a system override advisory. In operation 434, the system is turned off, preferably for a predetermined period of time and/or for this particular location/facility. After the time period has elapsed or the aircraft has left the vicinity of the location/facility, the system is reinitiated.

If the override code has not been entered, in operation 426, a violation and control intervention scheme template is retrieved, variables are input (including that aircraft is equipped with auto-flight capabilities), and violation and control intervention scheme information is transmitted. Also, a cockpit intervention advisory template can be retrieved, variables input and output.

In operation 428, a control intervention scheme (CIS) is retrieved and implemented via an auto-flight system interface. In operation 430, the aircraft's position is monitored to determine when automatic-pilot intervention is complete, or if override code is entered. The process proceeds to operation 418.

Note that some of the functions set forth in the process of FIG. 18 can also be performed by the TU, with appropriate communications being made between the TU and RU to coordinate the functioning of both. For example, determinations relating to position and projected flight path of the aircraft, selection and transmission of advisories, etc. can be performed by the TU. Likewise, some operations performed by the RU can alternatively be performed by the TU.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for receiving at least one of advisory information and vehicle control information, the method comprising:

reading positioning data using a positioning system;

determining at least one of a location, heading, and speed of the positioning system using the positioning data;

receiving information about a target footprint at a receiving unit, or determining a target footprint using the at least one of the location, heading, and speed of the positioning system using the receiving unit;

determining whether the receiving unit is in the target footprint based on the current geographic location;

receiving the at least one of the advisory information and the vehicle control information from a transmitting unit using the receiving unit;

determining whether the at least one of the advisory information and the vehicle control information is directed to the receiving unit, wherein the receiving unit determines whether the advisory information is directed to the receiving unit when the advisory information is received; and outputting the at least one of the advisory information and the vehicle control information when the at least one of the advisory information and the vehicle control information is directed to the receiving unit and the receiving unit is in the target footprint.

2. The method as recited in claim 1, wherein the transmitting unit is associated with law enforcement.

3. The method as recited in claim 1, wherein the advisory information is audibly output in the vehicle.

4. The method as recited in claim 3, wherein the advisory information is based on a live voice transmission.

5. The method as recited in claim 1, wherein the vehicle control information is output to a control interface for shutting down an engine of the vehicle.

6. The method as recited in claim 1, wherein the vehicle control information is output to a control interface for at least one of controlling brakes of the vehicle, controlling steering of the vehicle, and controlling acceleration of the vehicle.

7. The method as recited in claim 6, wherein a remote user controls at least one of shutting down an engine of the vehicle, the brakes of the vehicle, the steering of the vehicle, and the acceleration of the vehicle.

8. The method as recited in claim 1, wherein the determination of whether the receiving unit is in the target footprint is based in part on a heading and speed of the transmitting unit; further comprising reducing a volume of an audio system prior to outputting the advisory information, wherein the advisory information is repeatedly output at predetermined intervals.

9. The method as recited in claim 8, further comprising determining whether to output the advisory information based on at least one of the current speed and heading of the receiving unit when the receiving unit is in the target footprint, wherein the receiving unit generates the target footprint, the target footprint being smaller than a broadcasting range of the transmitting unit.

10. The method as recited in claim 1, further comprising determining whether to output the advisory information based on at least one of the current speed and heading of the receiving unit when the receiving unit is in the target footprint, wherein the receiving unit generates the target footprint, the target footprint being smaller than a broadcasting range of the transmitting unit.

* * * * *